US009630171B2

(12) United States Patent
Long et al.

(10) Patent No.: US 9,630,171 B2
(45) Date of Patent: Apr. 25, 2017

(54) CATALYST CONTAINING A MODIFIED Y-TYPE ZEOLITE AND A PREPARATION PROCESS THEREOF

(71) Applicants: Jun Long, Beijing (CN); Fei Ren, Beijing (CN); Yuxia Zhu, Beijing (CN); Yibin Luo, Beijing (CN); Jiasong Yan, Beijing (CN); Xue Yang, Beijing (CN); Huiping Tian, Beijing (CN); Li Zhuang, Beijing (CN); Beiyan Chen, Beijing (CN); Minggang Li, Beijing (CN); Ying Ouyang, Beijing (CN); Xiangtian Shu, Beijing (CN)

(72) Inventors: Jun Long, Beijing (CN); Fei Ren, Beijing (CN); Yuxia Zhu, Beijing (CN); Yibin Luo, Beijing (CN); Jiasong Yan, Beijing (CN); Xue Yang, Beijing (CN); Huiping Tian, Beijing (CN); Li Zhuang, Beijing (CN); Beiyan Chen, Beijing (CN); Minggang Li, Beijing (CN); Ying Ouyang, Beijing (CN); Xiangtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 805 days.

(21) Appl. No.: 13/929,044

(22) Filed: Jun. 27, 2013

(65) Prior Publication Data

US 2014/0005032 A1    Jan. 2, 2014

(30) Foreign Application Priority Data

Jun. 27, 2012  (CN) .......................... 2012 1 0217714
Jun. 27, 2012  (CN) .......................... 2012 1 0217724
Jun. 27, 2012  (CN) .......................... 2012 1 0219566
Jun. 27, 2012  (CN) .......................... 2012 1 0220785

(51) Int. Cl.
*B01J 29/06* (2006.01)
*B01J 29/80* (2006.01)
*B01J 29/08* (2006.01)
*C01B 39/02* (2006.01)
*B01J 37/30* (2006.01)
*B01J 37/28* (2006.01)

(52) U.S. Cl.
CPC ............ *B01J 29/80* (2013.01); *B01J 29/088* (2013.01); *C01B 39/026* (2013.01); *B01J 37/28* (2013.01); *B01J 37/30* (2013.01); *B01J 2229/16* (2013.01); *B01J 2229/186* (2013.01); *B01J 2229/36* (2013.01); *B01J 2229/37* (2013.01); *B01J 2229/42* (2013.01)

(58) Field of Classification Search
USPC ... 502/63, 64, 65, 67, 68, 69, 71, 73, 77, 79
See application file for complete search history.

(56) References Cited

U.S. PATENT DOCUMENTS

| 3,442,795 A | 5/1969 | Kerr et al. |
| 3,714,072 A | 1/1973 | Maat et al. |
| 4,259,212 A | 3/1981 | Giadrow et al. |
| 4,503,023 A | 3/1985 | Breck et al. |
| 5,013,699 A | 5/1991 | Vassilakis et al. |
| 5,232,675 A | 8/1993 | Shu et al. |
| 5,286,370 A | 2/1994 | Chu et al. |
| 2009/0230023 A1 | 9/2009 | Iino et al. |
| 2014/0299511 A1 | 10/2014 | Luo et al. |

FOREIGN PATENT DOCUMENTS

| CN | 1053808 A | 8/1991 |
| CN | 1026225 C | 10/1994 |
| CN | 1098130 A | 2/1995 |
| CN | 1297018 A | 5/2001 |
| CN | 1069553 C | 8/2001 |
| CN | 1317547 A | 10/2001 |
| CN | 1362472 A | 8/2002 |
| CN | 1382631 A | 12/2002 |
| CN | 1388064 A | 1/2003 |
| CN | 1436727 A | 8/2003 |
| CN | 1132898 C | 12/2003 |
| CN | 1506161 A | 6/2004 |

(Continued)

OTHER PUBLICATIONS

Tao, Liu, et.al., "Progress in Commercial Technologies for Domestic FCC Catalysts for High Efficiency Heavy Oil Conversion", Sino-Global Energy, 14(1), pp. 71-77 (2009).

(Continued)

*Primary Examiner* — Elizabeth Wood
(74) *Attorney, Agent, or Firm* — Finnegan, Henderson, Farabow, Garrett & Dunner LLP

(57) ABSTRACT

The present invention discloses a catalytic cracking catalyst and a preparation process therefor. The catalytic cracking catalyst comprises a cracking active component, 10 wt %-70 wt % of a clay on the dry basis, and 10 wt %-40 wt % of an inorganic oxide binder (as oxide), relative to the weight of the catalytic cracking catalyst, wherein said cracking active component contains, relative to the weight of the catalytic cracking catalyst, 10 wt %-50 wt % of a modified Y-type zeolite on the dry basis and 0-40 wt % of other zeolite on the dry basis, wherein said modified Y-type zeolite is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g.

23 Claims, 2 Drawing Sheets

(56) References Cited

FOREIGN PATENT DOCUMENTS

| CN | 1157465 C | 7/2004 |
|---|---|---|
| CN | 1624079 A | 6/2005 |
| CN | 1727442 A | 2/2006 |
| CN | 1727445 A | 2/2006 |
| CN | 1733363 A | 2/2006 |
| CN | 1951814 A | 4/2007 |
| CN | 100344374 C | 10/2007 |
| CN | 101081369 A | 12/2007 |
| CN | 101147875 A | 3/2008 |
| CN | 101250428 A | 8/2008 |
| CN | 101285001 A | 10/2008 |
| CN | 101385983 A | 3/2009 |
| CN | 100497175 C | 6/2009 |
| CN | 101537366 A | 9/2009 |
| CN | 101767028 A | 7/2010 |
| CN | 101823726 A | 9/2010 |
| CN | 101898144 A | 12/2010 |
| CN | 102009985 A | 4/2011 |
| CN | 102125870 A | 7/2011 |
| CN | 103073024 A | 5/2013 |
| EP | 0421422 A2 | 4/1991 |
| WO | WO 2011/115785 A1 | 9/2011 |

OTHER PUBLICATIONS

Lin et al., "Quantitive Characterization of "Hydroxyl Nests" Concentration for the Dealuminated Y Zeolite," *Acta Physico-Chimica Sinica*, vol. 14, No. 12 (Dec. 1998). pp. 1094-1097.

CATALYST CONTAINING A MODIFIED Y-TYPE ZEOLITE AND A PREPARATION PROCESS THEREOF

The present application claims the priority of Chinese Patent Application Nos. 201210220785.4, 201202219566.4, 201202177724.2, and 201210217714.9 filed on Jun. 27, 2012, which is incorporated herein by reference in its entirety.

TECHNICAL FIELD

The present invention relates to a catalytic cracking catalyst containing a modified Y-type zeolite and a preparation process thereof.

BACKGROUND OF THE INVENTION

Due to the decreasing petroleum resource, it has become an inarguable fact that the crude oil becomes heavier and inferior. As a main processing means of converting the heavy oil to light fuels such gasoline and diesel oil, it is inevitable for the catalytic cracking to treat more inferior raw heavy oil more and more. The decreased conversion and the increased coke yield are caused by the influence of the inferior raw oil on the catalytic cracking. Therefore, many researches are conducted in the aspects of modifying the zeolite, producing the catalyst, and designing the process (Liu Tao, Zhang Zhongdong, Zhang Haitao, Sino-Global Energy. 2009, 14(1):71-77). However, for most of the current catalyst designing and industrial operation, the high yield of light oils and LPG is achieved by increasing the conversion for the cracking reaction, and therefore the coke yield is remarkly increased. This results in wasting the petroleum resource. In order to improve the utilization of heavy oil, the conversion may be properly controlled to reduce the coke yield and improve the coke selectivity. It is the zeolite in the composition of the FCC catalyst to have a deterministic impact on the comprehensive reaction performance of the catalyst. Therefore, it is a most effective means for improving the reaction performance of catalytic cracking catalyst to modify the zeolite.

Coke is composed of various hydrogen-deficient compounds having different hydrogen deficiency degrees. It is a product of the hydrogen transfer reaction. Therefore, in order to decrease the coke yield, it is required to reduce the hydrogen transfer reaction appropriately. The main course of hydrogen transfer reaction is the adsorption, reaction and desorption of protonated olefins on the acid sites of the zeolite. The higher the acid site density of the zeolite is, the intenser the hydrogen transfer reaction becomes. The acid site density of the zeolite is relevant to the Si/Al ratio in the skeleton of the zeolite. The lower the Si/Al ratio in the skeleton of the zeolite, the more the number of the acid sites of aluminum-oxygen tetrahedron, the higher the acid site density of the zeolite, the more the number of the hydrogen transfer reactions, the quicker the hydrogen transfer reaction, and the higher the coke yield; on the opposite, the higher the Si/Al ratio in the skeleton of the zeolite, the lower the acid site density of the zeolite, the less the number of the hydrogen transfer reactions, and the lower the coke yield. Therefore, in order to ensure that an active component has good coke selectivity, it is required for the active component to have a lower unit cell size and a suitable acid site density.

It is well known that in the operation of a cracking unit, in order to maintain a stable reaction activity, it is required to discharge the spent catalyst and supplement the fresh catalyst. Therefore, there exists a catalyst age distribution. The catalysts with different ages have different reaction performances. The zeolite in the fresh catalyst has larger unit cell size, therefore the fresh catalyst has higher cracking activity, stronger hydrogen transfer ability, and higher coke yield. For the catalyst in a long run, the zeolite is subjected to skeleton dealumination and structural collapse under the hydrothermal condition, and therefore the spent catalyst has lower cracking activity and poorer reaction selectivity. It is clear that the catalysts in these two conditions are both unfavorable for increasing the heavy oil utilization. In order to improve the heavy oil utilization of the catalyst, it should start from increasing the reaction performances of the zeolite under different deactivation degrees. In one hand, the zeolite having a low unit cell size can be used so as to decrease the coke selectivity of the fresh zeolite, and on the other hand, the activity-stability of the zeolite can be improved by modification so as to improve the equilibrium-activity and reduce the activity differences in the different stages caused by the hydrothermal aging of the zeolite, in order to reduce the coke selectivity of the catalyst wholly and therefore increase the heavy oil utilization.

Using the Y-type zeolite having a lower unit cell size consequently reduces the catalyst activity and the heavy oil conversion capability. Therefore, other modifying elements should be added to improve the performance of the active components. The modification with rare earth can remarkably increase the cracking activity and the hydrothermal stability of the zeolite. However, it is shown by many studies that the zeolite with high rare earth content has poor coke selectivity. Therefore, it is suitable to use the medium/low rare earth content. Recently, the modification by introducing both P and rare earth into the zeolite is adopted to improve the catalytic performance.

Patent literatures such as CN1157465C, CN1436727A, CN1506161A, CN1317547A, CN101537366A, EP0421422 and CN1951814A disclose the Si/Al ratio of the Y-type zeolite is increased by hydrothermal dealumination and/or chemical dealumination, and the shrinkage of unit cell is achieved by the second hydrothermal calcination. However, during the course of the deep dealumination ($SiO_2/Al_2O_3$ molar ratio≥15), the zeolite structure is often destroyed to decrease the zeolite crystallinity.

U.S. Pat. No. 5,013,699 discloses a method of treating a Y-type zeolite, which method comprises NaY zeolite is subjected to ammonium ion exchange, and then high-temperature steam treatment. The resulting sample is then subjected to ammonium ion exchange at a pH of <4 and dealumination to obtain a zeolite product. According to that method, the zeolite sample is treated at a lower pH condition, and is not subjected to any protection. Therefore, the skeleton of the zeolite is prone to be destroyed, resulting in a decreased crystallinity of the zeolite.

U.S. Pat. No. 4,503,023 discloses a LZ-210 zeolite and its preparation method. Said method comprises a NaY zeolite is subjected to dealumination and silicon substitution with fluorosilicate to increase the Si/Al ratio of the zeolite. The resulting product has a higher crystallinity. However, when the Y-zeolite is dealuminated with fluorosilicate, the SiO2/Al2O3 molar ratio of the zeolite product is usually not higher than 13, otherwise the crystallinity of the zeolite product is remarkably decreased. In addition, the modified Y-zeolite prepared by dealumination and silicon substitution with fluorosilicate has few or no secondary holes, which is unfavorable for catalytically cracking the heavy oil.

CN1157465C discloses a catalytic cracking catalyst, which is composed of 50-95 wt % of the support and 5-50 wt % of the zeolite containing alkali-earth metal. That catalyst is prepared through mixing a compound containing alkali-earth metal with a zeolite homogenously in the presence of water optionally with the addition of aqueous ammonia, drying, calcining to obtain a zeolite containing alkali-earth metal, dispersing it in a support slurry, and drying-shaping.

SUMMARY OF THE INVENTION

An object of the present invention is to provide a modified Y-type zeolite containing phosphorus and rare earth, which has good stability and/or has an ability of decreasing coke make.

Another object of the present invention is to provide a preparation process for the modified Y-type zeolite.

Another object of the present invention is to provide a use of the modified Y-type zeolite in catalytically cracking the raw heavy oil.

In another aspect, an object of the present invention is to provide a catalytic cracking catalyst having high stability, low coke yield, and high heavy oil utilization. Said catalyst contains a novel modified Y-type zeolite.

The present invention provides a modified Y-type zeolite, which is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g, said specific hydroxy nest concentration =

$$\frac{[(M_{500^\circ C.} - M_{200^\circ C.}) - (17/9) \times (M_{800^\circ C.} - M_{500^\circ C.})] \times 1000}{36 \times (1 - M_{200^\circ C.}) \times C} \text{ (Unit: mmol/g)}$$

wherein $M_{200^\circ C.}$, $M_{500^\circ C.}$ and $M_{800^\circ C.}$ respectively represent the weight loss percents of a sample measured at 200° C., 500° C. and 800° C., and C is the crystallinity of the sample. The weight loss percent and the crystallinity of the sample are measured according to the methods as mentioned hereinafter.

The present invention further provides a catalytic cracking catalyst, which contains a cracking active component, 10 wt %-70 wt % of a clay on the dry basis, and 10 wt %-40 wt % of an inorganic oxide binder (as oxide), relative to the weight of the catalytic cracking catalyst, wherein said cracking active component contains, relative to the weight of the catalytic cracking catalyst, 10 wt %-50 wt % of the modified Y-type zeolite on the dry basis and 0-40 wt % of other zeolite on the dry basis.

In another aspect, the present invention provides a process for preparing a catalytic cracking catalyst, which process comprises said modified Y-type zeolite, other zeolite, the clay and the inorganic oxide binder are subjected to mixing, pulping and spray-drying.

The present invention also provides a process for preparing the above-mentioned modified Y-type zeolite, wherein said modified Y-type zeolite is obtained by using a NaY zeolite as starting material and through a three-exchanges-and-three-calcinations procedure. That is to say, the zeolite as starting material is subjected to a combination procedure comprising three exchange steps and three hydrothermally treating steps. The introduction of phosphorus and rare earth is done by the exchange step. The zeolite is added to a phosphorus-containing exchanging solution or a rare earth-containing exchanging solution to conduct the exchange. Phosphorus can be introduced at any exchange step, and can be added once or in several times. Rare earth can be introduced at any exchange step except the first exchange step. In the exchange step, a dealumination agent can be added to conduct a chemical dealumination for promoting the removal of aluminum. The chemical dealumination can be conducted at any exchange step except the first exchange step.

Since the aluminum vacancies formed after dealumination can be substituted with silicon as much as possible, the modified Y-type zeolite according to the present invention has few defect in the crystal lattice, and therefore has a very excellent stability, a good structure-hydrothermal stability and a good activity-hydrothermal stability. The application of the zeolite in the catalytic cracking catalyst as active component can maintain a long period stable activity, effectively control the coke yield and increase the heavy oil utilization.

More specifically, the present invention provide the following technical solutions:

1. A catalytic cracking catalyst, which comprises a cracking active component, 10 wt %-70 wt % of a clay on the dry basis, and 10 wt %-40 wt % of an inorganic oxide binder (as oxide), relative to the weight of the catalytic cracking catalyst, wherein said cracking active component contains, relative to the weight of the catalytic cracking catalyst, 10 wt %-50 wt % of a modified Y-type zeolite on the dry basis and 0-40 wt % of other zeolite on the dry basis, wherein said modified Y-type zeolite is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g, said specific hydroxy nest concentration =

$$\frac{[(M_{500^\circ C.} - M_{200^\circ C.}) - (17/9) \times (M_{800^\circ C.} - M_{500^\circ C.})] \times 1000}{36 \times (1 - M_{200^\circ C.}) \times C} \text{ (Unit: mmol/g)}$$

wherein $M_{200^\circ C.}$, $M_{500^\circ C.}$ and $M_{800^\circ C.}$ respectively represent the weight loss percents of a sample measured at 200° C., 500° C. and 800° C., and C is the crystallinity of the sample.

2. The catalytic cracking catalyst according to any one of the previous technical solutions, wherein said unit cell size is 2.428-2.438 nm; as percent by weight of the modified Y-type zeolite, the phosphorus content is 0.1-4.5%, the $RE_2O_3$ content is 0.1-4.5%, the alumina content is less than 21%; the specific hydroxy nest concentration is less than 0.3 mmol/g and more than 0.10 mmol/g.

3. The catalytic cracking catalyst according to any one of the previous technical solutions, wherein said clay is selected from the group consisting of kaolin, metahalloysite, montmorillonite, diatomite, halloysite, saponite, recto rite, sepiolite, attapulgite, hydrotalcite, bentonite and any mixture thereof; wherein said inorganic oxide binder is an alumina binder, including γ-alumina, η-alumina, θ-alumina, χ-alumina, pseudoboehmite, boehmite, gibbsite, bayerite, and any mixture thereof.

4. The catalytic cracking catalyst according to any one of the previous technical solutions, wherein said other zeolite is selected from one or more of the following:
Y-type zeolite such as one or more zeolites of REY, REHY, DASY, USY, and REUSY;
MFI-structured zeolite such as one or more zeolites of ZSM-5, ZRP, and ZSP; Beta zeolite; and
Non-zeolite molecular sieve such as SAPO and titanium silicate molecular sieve.

5. The catalytic cracking catalyst according to any one of the previous technical solutions, wherein, relative to the weight of the catalytic cracking catalyst, said catalytic cracking catalyst comprises:
10 wt %-70 wt % of the clay on the dry basis;
10 wt %-40 wt % of the inorganic oxide binder (as oxide); and
the cracking active component;
wherein said cracking active component comprises, substantially consists of or consists of:
　　(A) 10 wt %-50 wt % of the modified Y-type zeolite on the dry basis;
　　(B) optionally, one or more of the following:
　　　　(1) not more than 30 wt % of MH-structured zeolite on the dry basis;
　　　　(2) not more than 30 wt % of Mg-containing ultra stable Y-type zeolite on the dry basis;
　　　　(3) on the dry basis, not more than 30 wt % of rare earth modified, gas-phase ultra stable Y-type zeolite and/or rare earth-containing, acid-treated, hydrothermally dealuminated Y-type zeolite; and
　　(C) optionally,
　　　　(4) on the dry basis, not more than 30 wt % of Y-type zeolite selected from the group consisting of REY, REHY, DASY, USY, REUSY and any mixture thereof,
wherein, the total weight of the above (1), (2), (3) and (4) is not more than 40 wt %.

6. The catalytic cracking catalyst according to any one of the previous technical solutions, wherein said modified Y-type zeolite is prepared by the following process, wherein the modified Y-type zeolite is obtained by using a NaY zeolite as starting material and through three exchange steps in which a rare earth-containing substance and a phosphorus-containing substance are used and three hydrothermally treating steps,
wherein, the introduction of phosphorus and rare earth is done by the exchange step;
wherein independently in each exchange step, the zeolite is added to a phosphorus-containing exchanging solution or a rare earth-containing exchanging solution;
wherein phosphorus is introduced at any exchange step; and wherein rare earth is introduced at any exchange step except the first exchange step.

7. The catalytic cracking catalyst according to the technical solution 6, said process further comprises: a dealumination agent is introduced at any exchange step except the first exchange step.

8. The catalytic cracking catalyst according to the technical solution 6, wherein said phosphorus-containing substance is selected from the group consisting of orthophosphoric acid, phosphorous acid, pyrophosphoric acid, ammonium phosphate, diammonium hydrogen phosphate, ammonium dihydrogen phosphate, aluminum phosphate, and any mixture thereof.

9. The catalytic cracking catalyst according to the technical solution 6, wherein said rare earth-containing substance is selected from the group consisting of lanthanum oxide, cerium oxide, lanthanum nitrate, cerium nitrate, lanthanum chloride, cerium chloride, a mixed rare earth nitrate, a mixed rare earth chloride, and any mixture thereof.

10. The catalytic cracking catalyst according to the technical solution 7, wherein said dealumination agent is selected from the group consisting of ethylene diamine tetraacetic acid, oxalic acid, citric acid, sulfosalicylic acid, fluorosilicic acid, hydrochloric acid, sulphuric acid, nitric acid, ammonium oxalate, ammonium fluoride, ammonium fluorosilicate, ammonium fluoroborate, and any mixture thereof.

11. The catalytic cracking catalyst according to the technical solution 6, which further comprises: the exchange is conducted at 60-100° C., e.g. 70-90° C. for at least 0.5 hour, e.g. 1-2 hours.

12. The catalytic cracking catalyst according to the technical solution 6, wherein each of the hydrothermally treating steps is independently conducted at 350-650° C., e.g. 550-600° C., in a condition of 1-100%, e.g. 70%-100% steam for at least 0.5 hour, e.g. 1-2 hours.

13. The catalytic cracking catalyst according to the technical solution 6, which is characterized in that said process comprises the following steps:
　　1) a NaY zeolite is mixed with an ammonium salt, an ammonium phosphate salt and water in a ratio of the NaY zeolite:the ammonium salt:the ammonium phosphate salt:water=1:[0.4-1]:[0-0.04]:[5-10] to obtain a slurry, the slurry is adjusted with an inorganic acid to a pH of 3.0-4.5, then the slurry is treated at 70-95° C. for at least 0.5 hour, and then washed, wherein, the NaY zeolite is on the dry basis, the ammonium phosphate salt is based on the elemental phosphorus;
　　2) the product obtained in the step 1) is calcined at 350-650° C. in a condition of 1-100% steam for at least 0.5 hour to obtain a firstly calcined zeolite;
　　3) the firstly calcined zeolite obtained in the step 2), phosphoric acid, an dealumination agent and water are mixed in a ratio of the firstly calcined zeolite:phosphoric acid:the dealumination agent:water=1:[0-0.04]:[0.02-0.3]:[5-10], the resulting mixture is adjusted with an inorganic acid to a pH of 2.3-3.5, then treated at 50-90° C. for at least 0.5 hour, filtered and washed (washing temperature≥50° C.), wherein, the firstly calcined zeolite is on the dry basis, and phosphoric acid is based on the elemental phosphorus;
　　4) the product obtained in the step 3) is calcined at 350-650° C. in a condition of 1-100% steam for at least 0.5 hour to obtain a secondly calcined zeolite;
　　5) the secondly calcined zeolite obtained in the step 4) is mixed with a rare earth chloride and water in a ratio of the secondly calcined zeolite:the rare earth chloride:water=1:[0.01-0.05]:[5-10], the resulting mixture is then treated at 70-90° C. for at least 0.5 hour, filtered and washed (washing temperature≥50° C.), wherein, the secondly calcined zeolite is on the dry basis, and the rare earth chloride is based on $RE_2O_3$;
　　6) the product obtained in the step 5) is calcined at 350-650° C., in a condition of 1-100% steam for at least 0.5 hour to obtain a modified Y-type zeolite.

14. A process for preparing a catalytic cracking catalyst, which process comprises: preparing a slurry containing an cracking active component, a clay and a binder; and spray-drying the prepared slurry,
wherein said cracking active component contains a modified Y-type zeolite and other zeolite,
wherein per 100 weight parts of the catalytic cracking catalyst, using 10-70 weight parts of the clay on the dry basis, 10-40 weight parts of the inorganic oxide binder (as oxide), 10-50 weight parts of the modified Y-type zeolite on the dry basis, and 0-40 weight parts of other zeolite on the dry basis to prepare said slurry, wherein said modified Y-type zeolite is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g, said specific hydroxy nest concentration =

$$\frac{[(M_{500°C.} - M_{200°C.}) - (17/9) \times (M_{800°C.} - M_{500°C.})] \times 1000}{36 \times (1 - M_{200°C.}) \times C} \text{ (Unit: mmol/g)}$$

wherein $M_{200°C.}$, $M_{500°C.}$ and $M_{800°C.}$ respectively represent the weight loss percents of a sample measured at 200° C., 500° C. and 800° C., and C is the crystallinity of the sample.

15. The process for preparing the catalytic cracking catalyst according to the technical solution 14, wherein said unit cell size is 2.428-2.438 nm; as percent by weight of the modified Y-type zeolite, the phosphorus content is 0.1-4.5%, the $RE_2O_3$ content is 0.1-4.5%, the alumina content is less than 21%; the specific hydroxy nest concentration is less than 0.3 mmol/g and more than 0.10 mmol/g.

16. The process for preparing the catalytic cracking catalyst according to any of the technical solutions 14-15, wherein said clay is selected from the group consisting of kaolin, metahalloysite, montmorillonite, diatomite, halloysite, saponite, rectorite, sepiolite, attapulgite, hydrotalcite, bentonite and any mixture thereof; wherein said inorganic oxide binder is an alumina binder, including γ-alumina, η-alumina, θ-alumina, χ-alumina, pseudoboehmite, boehmite, gibbsite, bayerite, and any mixture thereof.

17. The process for preparing the catalytic cracking catalyst according to any of the technical solutions 14-16, wherein said other zeolite is selected from one or more of the following:
Y-type zeolite such as one or more zeolites of REY, REHY, DASY, USY, and REUSY;
MFI-structured zeolite such as one or more zeolites of ZSM-5, ZRP, and ZSP; Beta zeolite; and
non-zeolite molecular sieve such as SAPO and titanium silicate molecular sieve.

18. The process for preparing the catalytic cracking catalyst according to any of the technical solutions 14-17, wherein per 100 weight parts of the catalytic cracking catalyst, using
10-70 weight parts of the clay on the dry basis;
10-40 weight parts of the inorganic oxide binder (as oxide); and
the cracking active component
wherein said cracking active component comprises, substantially consists of or consists of:
  (A) 10-50 weight parts of the modified Y-type zeolite on the dry basis;
  (B) optionally, one or more of the following:
    (1) not more than 30 weight parts of MFI-structured zeolite on the dry basis;
    (2) not more than 30 weight parts of Mg-containing ultra stable Y-type zeolite on the dry basis;
    (3) on the dry basis, not more than 30 weight parts of rare earth modified, gas-phase ultra stable Y-type zeolite and/or rare earth-containing, acid-treated, hydrothermally dealuminated Y-type zeolite; and
  (C) optionally,
    (4) on the dry basis, not more than 30 weight parts of Y-type zeolite selected from the group consisting of REY, REHY, DASY, USY, REUSY and any mixture thereof,
wherein, the total weight of the above (1), (2), (3) and (4) is not more than 40 weight parts.

19. The process for preparing the catalytic cracking catalyst according to any of the technical solutions 14-18, wherein said modified Y-type zeolite is prepared according to the process as defined in any one of the technical solutions 6-13.

The catalytic cracking catalyst according to the present invention can show a good stability in the catalytic cracking, and can decrease the coke yield and increase the heavy oil utilization. The catalytic cracking catalyst according to the present invention can also show a good diesel oil yield, a good gasoline yield, a good lower olefin (such as propylene) yield, or a good total yield of diesel oil and gasoline

DESCRIPTION OF PREFERRED EMBODIMENTS

Figure 1:
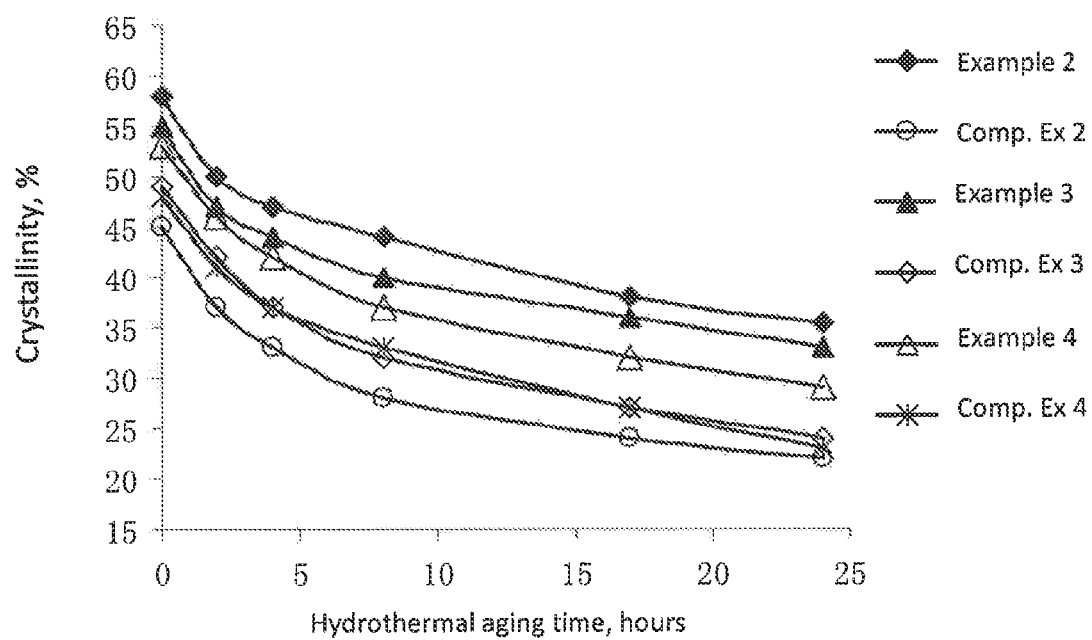
FIG. 1 shows a curve for comparing the data about the crystallinity between the Example and the Comparative Example.

Coke is composed of various hydrogen-deficient compounds having different hydrogen deficiency degrees. It is a product of the hydrogen transfer reaction. Therefore, in order to decrease the coke yield, it is required to reduce the hydrogen transfer reaction. The main course of hydrogen transfer reaction is the adsorption, reaction and desorption of protonated olefins on the acid sites of the zeolite. The higher the acid site density of the zeolite is, the intenser the hydrogen transfer reaction becomes. The acid site density of the zeolite is relevant to the Si/Al ratio in the skeleton of the zeolite. The lower the Si/Al ratio in the skeleton of the zeolite, the more the number of the acid sites of aluminum-oxygen tetrahedron, the higher the acid site density of the zeolite, the more the number of the hydrogen transfer reactions, the quicker the hydrogen transfer reaction, and the higher the coke yield; on the opposite, the higher the Si/Al ratio in the skeleton of the zeolite, the lower the acid site density of the zeolite, the less the number of the hydrogen transfer reactions, and the lower the coke yield. Therefore, in order to ensure that an active component has good coke selectivity, it is required for the active component to have a lower unit cell size and a suitable acid site density.

Modified Y-Type Zeolite

The present invention provides a modified Y-type zeolite, wherein the unit cell size is 2.420-2.440 nm, preferably the unit cell size is 2.428-2.438 nm; as percent by weight, the phosphorus content is 0.05-6%, preferably 0.1-4.5%, the RE$_2$O$_3$ content is 0.03-10%, preferably 0.1-4.5%, the alumina content is less than 22%, preferably less than 21%, the specific hydroxy nest concentration is less than 0.35 mmol/g, preferably less than 0.3 mmol/g and more than 0.05 mmol/g, preferably more than 0.10 mmol/g, said specific hydroxy nest concentration =

$$\frac{[(M_{500°C.} - M_{200°C.}) - (17/9) \times (M_{800°C.} - M_{500°C.})] \times 1000}{36 \times (1 - M_{200°C.}) \times C}$$ (Unit: mmol/g)

wherein $M_{200°C.}$, $M_{500°C.}$ and $M_{800°C.}$ respectively represent the weight loss percents of a sample measured at 200° C., 500° C. and 800° C., and C is the crystallinity of the sample.

Due to dealumination in the skeleton of the zeolite, the "hydroxy nest" is formed from four adjacent Si—OH groups at its aluminum vacancy. The hydroxy nest is a defect site in the crystal lattice of the zeolite. The number of the hydroxy nest is directly relevant to the structure stability of the zeolite. The more the hydroxy nests, the more the aluminum vacancies formed due to dealumination in the skeleton of the zeolite, and the poorer the structure stability of the zeolite. The aluminum vacancies formed during the hydrothermal or chemical dealumination of the Y-type zeolite are substituted with free silicon. The dealumination process and the treating conditions in the modification of the zeolite have a direct impact on the stability of the modified zeolite. It is surprisingly found by the present inventors based on a large quantity of experiments that after the three-exchanges-and-three-calcinations procedure, in the modified Y-type zeolite, the aluminum vacancies formed in the skeleton dealumination can be sufficiently substituted with silicon, the number of hydroxy nests reduce, and therefore the stability is remarkably increased.

For the Y-type zeolite provided by the present invention, the specific hydroxy nest concentration is characterized by a method in the literature (Liu Xing-Yun, Liu Hui, Li Xuan-Wen, Xu Xiao-Jie. Quantitative Characterization of "Hydroxyl Nests" Concentration for the Dealuminated Y Zeolite M. Acta Phys. Chim. Sin., 1998, 14(12): 1094-1097). According to that method, the specific hydroxy nest concentration is obtained by the thermo-gravimetric analysis and calculation for the sample.

On the weight loss curve, the curve below 200° C. corresponds to the weight loss due to removal of the adsorbed water, the curve of 200° C.-500° C. corresponds to the weight loss due to removal of ammonium from zeolite and removal of water from hydroxy nest, and the curve of 500° C.-800° C. corresponds to the weight loss due to removal of hydroxy. The decomposition of NH$_4^+$ on the Y-type zeolite produces an acidic hydroxy, and therefore, the mole number of hydroxy corresponds to that of NH$_3$. Thus, the mole number of hydroxy is calculated from the weight loss curve of 500° C.-800° C., and converted to the mass of NH$_3$. The mole number of hydroxy nest can be calculated by subtracting the amount of NH$_3$ from the weight loss amount calculated from the weight loss curve of 200° C.-500° C.

In hydroxy nest concentration calculation, one hydroxy nest disappears due to removal of two molecules of water, and therefore its molar mass is 36; and two hydroxy groups removes one molecule of water, and therefore its molar mass is 9.

The present invention also provides a process for preparing the above-mentioned modified Y-type zeolite, wherein said modified Y-type zeolite is obtained by using a NaY zeolite as starting material and through a three-exchanges-and-three-calcinations procedure. The so-called "three-exchanges-and-three-calcinations procedure" refers to a modification process for the zeolite for short. That is to say, the zeolite as starting material is subjected to a combination procedure comprising three exchange steps and three hydrothermally treating steps. The introduction of phosphorus and rare earth is done by the exchange step. The zeolite is added to a phosphorus-containing exchanging solution or a rare earth-containing exchanging solution to conduct the exchange. Phosphorus can be introduced at any exchange step, and can be added once or in several times. Rare earth can be introduced at any exchange step except the first exchange step. In the exchange step, a dealumination agent can be added to conduct a chemical dealumination for promoting the removal of aluminum. The chemical dealumination can be conducted at any exchange step except the first exchange step.

In an embodiment of the present invention, said phosphorus-containing exchanging solution contains a phosphorus-containing substance.

In an embodiment of the present invention, said rare earth-containing exchanging solution contains a rare earth-containing substance.

In an embodiment of the present invention, said phosphorus-containing exchanging solution does not contain any rare earth-containing substance.

In an embodiment of the present invention, said rare earth-containing exchanging solution does not contain any phosphorus-containing substance.

According to the present invention, the phosphorus-containing substance refer to one or more of orthophosphoric acid, phosphorous acid, pyrophosphoric acid, ammonium phosphate, diammonium hydrogen phosphate, ammonium dihydrogen phosphate, aluminum phosphate.

According to the present invention, the ammonium salt refers to one or more of ammonium chloride, ammonium nitrate, ammonium carbonate, ammonium hydrogen carbonate, ammonium oxalate, ammonium sulfate, and ammonium hydrogen sulfate.

According to the present invention, the ammonium phosphate salt refers to one or more of ammonium phosphate, diammonium hydrogen phosphate, and ammonium dihydrogen phosphate.

According to the present invention, the rare earth-containing substance refers to one or more of lanthanum oxide, cerium oxide, lanthanum nitrate, cerium nitrate, lanthanum chloride, cerium chloride, a mixed rare earth nitrate, and a mixed rare earth chloride.

The mixed rare earth nitrate refers to (RE$_{x1}$RE$_{x2}$ . . . RE$_{xn}$)(NO$_3$)$_3$, wherein RE$_{x1}$, RE$_{x2}$, . . . , RE$_{xn}$ refer to rare earth elements, wherein n is an integer of 2 or more, the sum of x1+x2+ . . . +xn equals to 1.

The mixed rare earth chloride (also called as the rare earth chloride) refers to (RE$_{y1}$RE$_{y2}$ . . . RE$_{yn}$)Cl$_3$, wherein RE$_{y1}$, RE$_{y2}$, RE$_{yn}$ refer to rare earth elements, wherein n is an integer of 2 or more, the sum of y1+y2+ . . . +yn equals to 1.

According to the present invention, said dealumination agent is selected from the group consisting of organic acids (including ethylene diamine tetraacetic acid, oxalic acid, citric acid, and sulfosalicylic acid), inorganic acids (including fluorosilicic acid, hydrochloric acid, sulphuric acid, nitric acid), organic and inorganic salts (including ammonium oxalate, ammonium fluoride, ammonium fluorosilicate, and ammonium fluoroborate).

According to the present invention, the preparation process for said modified Y-type zeolite comprises a NaY zeolite is used as starting material and subjected to three exchanges and three hydrothermal treatments to obtain a modified Y-type zeolite, wherein independently in each exchange step, the zeolite is added to a phosphorus-containing exchanging solution or a rare earth-containing exchanging solution, the exchange is usually conducted at 60-100° C., preferably 70-90° C. for at least 0.5 hour, e.g. 1-2 hours. Phosphorus can be introduced at any exchange step, and can be added once or in several times. Rare earth can be introduced at any exchange step except the first exchange step. A chemical dealumination agent can be introduced at any exchange step except the first exchange step. Each of the hydrothermally treating steps is independently conducted at 350-650° C., e.g. 550-600° C., in a condition of 1-100%, e.g. 70%-100% steam for at least 0.5 hour, e.g. 1-2 hours.

In an embodiment of the process according to the present invention, the exchange is conducted at 60-100° C., e.g. 60-95° C., such as 70-90° C.

In an embodiment of the process according to the present invention, the exchange is conducted for 0.5-5 hours, e.g. 1-2 hours.

In an embodiment of the process according to the present invention, the hydrothermal treatment is conducted at 350-650° C., e.g. 550-600° C.

In an embodiment of the process according to the present invention, the hydrothermal treatment is conducted in a condition of 1-100%, e.g. 70%-100% steam.

In an embodiment of the process according to the present invention, the hydrothermal treatment is conducted for at least 0.5 hour, e.g. 1-2 hours.

According to the process of the present invention, the pH value of the liquid to which has been added the phosphorus-containing exchanging solution or the rare earth-containing exchanging solution in the exchange step can be adjusted with an inorganic acid, for example, to 2-5, e.g. 2.4-4. Said inorganic acid is selected from the group consisting of hydrochloric acid, sulphuric acid, nitric acid and any mixture thereof.

The preferable preparation process can comprise the following steps:

1) a NaY zeolite is (at least) mixed with an ammonium salt, an ammonium phosphate salt and water in a ratio of the NaY zeolite:the ammonium salt:the ammonium phosphate salt:water=1:[0.4-1]:[0-0.04]:[5-10] to obtain a slurry, the slurry is adjusted with an inorganic acid to a pH of 3.0-4.5, then the slurry is treated at 70-95° C. for at least 0.5 hour, and then washed, wherein, the NaY zeolite is on the dry basis, the ammonium phosphate salt is based on the elemental phosphorus;

2) the product obtained in the step 1) is calcined at 350-650° C. in a condition of 1-100% steam for at least 0.5 hour to obtain a firstly calcined zeolite;

3) the firstly calcined zeolite obtained in the step 2) is (at least) mixed with phosphoric acid, an dealumination agent and water in a ratio of the firstly calcined zeolite:phosphoric acid:the dealumination agent:water=1:0-0.04:0.02-0.3:5-10, the resulting mixture is adjusted with an inorganic acid to a pH of 2.3-3.5, then treated at 50-90° C. for at least 0.5 hour, filtered and washed (washing temperature≥50° C.), wherein, the firstly calcined zeolite is on the dry basis, and phosphoric acid is based on the elemental phosphorus;

4) the product obtained in the step 3) is calcined at 350-650° C. in a condition of 1-100% steam for at least 0.5 hour to obtain a secondly calcined zeolite;

5) the secondly calcined zeolite obtained in the step 4) is mixed with a rare earth chloride and water in a ratio of the secondly calcined zeolite:the rare earth chloride:water=1:[0.01-0.05]:[5-10], the resulting mixture is then treated at 70-90° C. for at least 0.5 hour, filtered and washed (washing temperature≥50° C.), wherein, the secondly calcined zeolite is on the dry basis, and the rare earth chloride is based on $RE_2O_3$;

6) the product obtained in the step 5) is calcined at 350-650° C., in a condition of 1-100% steam for at least 0.5 hour to obtain a modified Y-type zeolite.

According to the present invention, a modified zeolite having a high Si/Al ratio and small unit cell size is prepared with the "three-exchanges-and-three-calcinations procedure". The calcination conditions are mild. The aluminum vacancies formed after dealumination can be substituted with silicon as much as possible. Therefore, the modified zeolite has few defects in crystal lattices, and has a good structure-hydrothermal stability, a good activity-hydrothermal stability and a good coke selectivity.

Cracking Active Component

In the catalytic cracking catalyst of the present invention, besides the modified Y-type zeolite, other zeolite can be optionally present, usually in an amount of not more than 40 wt %, e.g. 0.5-40 wt %, such as 0.5-30 wt %. Said other zeolite can be selected from the group consisting of other Y-type zeolite conventionally used in the catalytic cracking catalyst, MFI-structured zeolite, Beta zeolite, non-zeolite molecular sieve, and any mixture thereof.

In the catalytic cracking catalyst of the present invention, the total content of other zeolite is not more than 40 wt %.

Said other Y-type zeolite is selected from other Y-type zeolites except the modified Y-type zeolite of the present invention, e.g. REY, REHY, DASY, USY, REUSY and any mixture thereof.

In an embodiment, REY, REHY and REUSY zeolites have rare earth content of more than 10 wt %. In an embodiment, DASY zeolite has rare earth content of less than 10 wt %.

Said MFI-structured zeolite is, for example, ZSM-5, ZRP, ZSP and any mixture thereof.

Said non-zeolite molecular sieve is, for example, SAPO, titanium silicate molecular sieve and any mixture thereof.

In an embodiment, said other zeolite includes REY zeolite and/or DASY zeolite. In an embodiment, based on the weight of said catalytic cracking catalyst, on the dry basis, said catalytic cracking catalyst contains 3-15 wt % of REY zeolite and/or DASY zeolite.

In an embodiment, said other zeolite includes at least one of (1) Mg-containing ultra stable Y-type zeolite, (2) MFI-structured zeolite, and (3) rare earth modified, gas-phase ultra stable Y-type zeolite and/or rare earth-containing, acid-treated, hydrothermally dealuminated Y-type zeolite, which is present in an amount of 0.5-30 wt %, based on the weight of said catalytic cracking catalyst, on the dry basis; in a further embodiment, said other zeolite further comprises REY zeolite and/or DASY zeolite.

In an embodiment, said other zeolite includes only one of (1) Mg-containing ultra stable Y-type zeolite, (2) MFI-structured zeolite, and (3) rare earth modified, gas-phase ultra stable Y-type zeolite and/or rare earth-containing, acid-treated, hydrothermally dealuminated Y-type zeolite, which is present in an amount of 0.5-30 wt %, based on the weight of said catalytic cracking catalyst, on the dry basis; In a further embodiment, said other zeolite further comprises REY zeolite and/or DASY zeolite.

In an embodiment, said other zeolite does not include any one of (1) Mg-containing ultra stable Y-type zeolite, (2) MFI-structured zeolite, and (3) rare earth modified, gas-phase ultra stable Y-type zeolite and/or rare earth-containing, acid-treated, hydrothermally dealuminated Y-type zeolite.

Mg-Containing Ultra Stable Y-Type Zeolite

In the catalytic cracking catalyst of the present invention, said Mg-containing ultra stable Y-type zeolite has a Mg content as MgO of 0.1-25 wt %, preferably 0.5-25 wt %. This zeolite can be prepared according to the conventional methods. One method comprises dispersing a magnesium compound (e.g. at least one of magnesium oxide, magnesium chloride, magnesium sulfate and magnesium nitrate), which is dissolved or sufficiently wet-grounded, evenly into a slurry of an ultra stable Y-type zeolite (USY zeolite), optionally adding aqueous ammonia thereto, mixing homogenously, drying and calcining. The other method can for example comprise dispersing an ultra stable Y-type zeolite (USY zeolite), which is sufficiently wet-grounded, evenly into a solution containing a magnesium compound (e.g. at least one of magnesium chloride, magnesium sulfate and magnesium nitrate), adding aqueous ammonia thereto, mixing homogenously, filtering, washing, drying and calcining.

For the specific examples of the above preparation methods for Mg-containing ultra stable Y-type zeolite, for example, a reference can be made to CN1297018A or CN11574656, in particular, Examples 1-5.

MFI-Structured Zeolite

MFI-structured zeolite can be commercially available or prepared according to the known method. The example of MFI-structured zeolite comprises ZSM-5, ZRP, ZSP and any mixture thereof.

In an embodiment, said MR-structured zeolite has an anhydrous chemical composition expression formula based on the weight ratio as oxide: $(0-0.3)Na_2O.(0.5-5.5)Al_2O_3.(1.3-10)P_2O_5.(0.7-15) M1_xO_y.(0.01-5)M2_mO_n.(70-97)SiO_2$, wherein, M1 is Fe, Co or Ni, x represents the atom number for M1, y represents the oxygen number required for satisfying the oxidation state of M1, M2 is selected from the group consisting of Zn, Mn, Ga or Sn, m represents the atom number of M2, n represents the oxygen number required for satisfying the oxidation state of M2.

In a preferable embodiment, said MR-structured zeolite has a formula based on the oxide weight ratio of $(0-0.2)Na_2O.(0.9-5.0)Al_2O_3.(1.5-7)P_2O_5.(0.9-10)M1_xO_y.(0.5-2) M2_mO_n.(82-92)SiO_2$. In a preferable embodiment, M1 is Fe, and M2 is Zn.

According to the present invention, for the specific preparation method for said MFI-structured zeolite, a reference can be made to CN1611299A, in particular, Examples 1-11.

Rare Earth Modified, Gas-Phase Ultra Stable V-Type Zeolite and/or Rare Earth-Containing, Acid-Treated, Hydrothermally Dealuminated V-Type Zeolite Rare earth modified, gas-phase ultra stable Y-type zeolite can be commercially available or prepared according to the known method. For example, said rare earth modified, gas-phase ultra stable Y-type zeolite can be prepared as follows. Under stirring, a rare earth-containing Y-type zeolite is contacted with tetrachlorosilane at 100-500° C. for 0.1-10 hours, wherein the weight ratio of said rare earth-containing Y-type zeolite to tetrachlorosilane is 1:0.05-0.5. For the specific preparation method for said rare earth modified, gas-phase ultra stable Y-type zeolite, a reference can be made to CN1683244A or CN1286721C, in particular, Examples 5, 6 and 8.

Rare earth-containing, acid-treated, hydrothermally dealuminated Y-type zeolite can be commercially available or prepared according to the known method. For example, said rare earth-containing, acid-treated, hydrothermally dealuminated Y-type zeolite can be prepared as follows. An ultra stable Y-type zeolite and an acid solution (having a concentration of 0.01-2N) in a solid-liquid weight ratio of 4-20 are thoroughly mixed at 20-100° C. After treating for 10-300 minutes, the mixture is washed and filtered. To the resulting material is added a rare earth salt solution to exchange with rare earth ions. After exchanging, the resulting material is successively subjected to washing, filtering and drying. For the specific preparation method for said rare earth-containing, acid-treated, hydrothermally dealuminated Y-type zeolite, a reference can be made to CN1958452A or CN100497175C, in particular Examples 1-6.

Clay

According to the present invention, said clay can be a clay conventionally used in the catalytic cracking catalyst, for example, can be one or more of kaolin, metahalloysite, montmorillonite, diatomite, halloysite, saponite, rectorite, sepiolite, attapulgite, hydrotalcite and bentonite.

Binder

According to the present invention, said binder is one or more of the inorganic oxide binders conventionally used in the catalytic cracking catalyst, preferably alumina binder. Said alumina binder is selected from the group consisting of alumina of various forms conventionally used in the cracking catalyst, hydrated alumina, alumina sol and any mixture thereof, for example, selected from the group consisting of γ-alumina, η-alumina, θ-alumina, χ-alumina, pseudoboehmite, boehmite, gibbsite, bayerite, and any mixture thereof, preferably a dual-aluminum binder of pseudoboehmite and alumina sol.

Catalytic Cracking Catalyst

In an embodiment, the catalytic cracking catalyst of the present invention comprises a cracking active component, 10 wt %-70 wt % of a clay on the dry basis, and 10 wt %-40 wt % of an inorganic oxide binder (as oxide), relative to the weight of the catalytic cracking catalyst, wherein said cracking active component contains, relative to the weight of the catalytic cracking catalyst, 10 wt %-50 wt % of a modified Y-type zeolite on the dry basis and 0-40 wt % of other zeolite on the dry basis.

In an embodiment, the catalytic cracking catalyst of the present invention, relative to the weight of the catalytic cracking catalyst, comprises:

10 wt %-70 wt % of a clay on the dry basis;
10 wt %-40 wt % of an inorganic oxide binder (as oxide); and
a cracking active component
wherein said cracking active component comprises, substantially consists of or consists of:
  (A) 10 wt %-50 wt % of the modified Y-type zeolite on the dry basis;
  (B) optionally, one or more of the following:
    (1) not more than 30 wt % of MFI-structured zeolite on the dry basis;
    (2) not more than 30 wt % of Mg-containing ultra stable Y-type zeolite on the dry basis;
    (3) on the dry basis, not more than 30 wt % of rare earth modified, gas-phase ultra stable Y-type zeolite and/or rare earth-containing, acid-treated, hydrothermally dealuminated Y-type zeolite; and (C) optionally, (4) on the dry basis, not more than 30 wt % of Y-type zeolite selected from the group consisting of REY, REHY, DASY, USY, REUSY and any mixture thereof, (excluding the above Mg-containing ultra stable Y-type zeolite, rare earth modified, gas-phase ultra stable Y-type zeolite and rare earth-containing, acid-treated, hydrothermally dealuminated Y-type zeolite)

wherein, the total weight of the above (1), (2), (3) and (4) is not more than 40 wt %.

In a further embodiment, the content of said clay is 20-40 wt %, e.g. 28-35 wt %.

In a further embodiment, the content of said inorganic oxide binder is 15-35 wt %, e.g. about 30 wt %.

In a further embodiment, the content of said modified Y-type zeolite is 5-40 wt %.

In a further embodiment, the content of said MFI-structured zeolite is 0.5-30M %, e.g. 2-28 wt %, e.g. 2-25M %, e.g. 2-15M %.

In a further embodiment, the content of said Mg-containing ultra stable Y-type zeolite is 0.5-30 wt %, e.g. 1-28M %, e.g. 1-25M %, e.g. 1-22 wt %.

In a further embodiment, the content of said rare earth modified, gas-phase ultra stable Y-type zeolite is 0.5-30 wt %, e.g. 2-28 wt %, e.g. 2-25 wt %, e.g. 2-15 wt %, e.g. 2-13 wt %.

In a further embodiment, the content of said rare earth-containing, acid-treated, hydrothermally dealuminated Y-type zeolite is 0.5-30M %, e.g. 2-30M %.

In a further embodiment, the content of one or more zeolites of REY, REHY, DASY, USY, and REUSY is 0.5-30M %, e.g. 2-28 wt %, e.g. 2-25 wt %, e.g. 2-15 wt %, e.g. 3-13M %.

In a further embodiment, said cracking active component comprises 2-20 wt %, e.g., 5-12 wt % of REY zeolite on the dry basis.

In a further embodiment, said cracking active component comprises 2-20 wt %, e.g. 3-13 wt % of DASY zeolite on the dry basis.

In a further embodiment, said cracking active component, relative to the weight of the catalytic cracking catalyst, consists of:

(A) 10 wt %-50 wt % of the modified Y-type zeolite on the dry basis, (B) not more than 30 wt % of Mg-containing ultra stable Y-type zeolite on the dry basis, (C) not more than 30 wt % of REY zeolite on the dry basis, wherein [the content of (B)×the content of (C)]/[the content of (A)×the content of (A)]<0.01 or >0.4; preferably, said REY zeolite has a rare earth content of >10 wt %, and said Mg-containing ultra stable Y-type zeolite has a rare earth content of <4 wt %.

In a further embodiment, said cracking active component, relative to the weight of the catalytic cracking catalyst, consists of:

(A) 10 wt %-50 wt % of the modified Y-type zeolite on the dry basis, (B) not more than 30 wt % of MFI-structured zeolite on the dry basis, (C) not more than 30 wt % of REY zeolite on the dry basis, wherein [the content of (B)×the content of (C)]/[the content of (A)×the content of (A)]>0.45 e.g. >0.5; preferably, said REY zeolite has a rare earth content of >10 wt %.

The Preparation Process for the Catalytic Cracking Catalyst

According to the present invention, the preparation method for the catalytic cracking catalyst comprises providing the cracking active component that includes said modified Y-type zeolite, mixing and pulping the cracking active component, the clay and the inorganic oxide binder, and then spray-drying. The preparation process has been discussed in detail in CN1098130A, CN1362472A, CN1727442A, CN1132898C, and CN1727445A, the contents of which are incorporated by reference herein.

In the present invention, including the following Examples and Comparative Examples, the analysis methods for the zeolite are as follows:

The element content is determined by X-ray fluorescence spectrometry.

The unit cell size and the crystallinity are determined by X-ray diffraction according to the standard methods RIPP145-90 and RIPP146-90 respectively. A reference can be made to *Analytical Methods in Petrochemical Indus* (*RIPP Experiment Techniques*), Yang Cuiding et. al, Science Press, 1990.

The crystallinity retention is the ratio of the crystallinity of the sample after the aging treatment to that before the aging treatment.

In the determination of the specific hydroxy nest concentration, the thermogravimetric analysis data of the zeolite is measured with a TAQ5000IR thermogravimetric analyzer at a constant nitrogen flow with a temperature rise at a speed of 10° C./min to 800° C. according to the TGA analysis procedure, and the specific hydroxy nest concentration is calculated out.

The light oil micro-activity (MA) is measured according to the standard method RIPP92-90, wherein 2 g of the zeolite is used.

EXAMPLES

Hereinafter, the present invention will be further illustrated with the examples, but the scope of the present invention is not limited thereto.

In the Examples and Comparative Examples, the used starting materials are commercially available and their detailed specifications are as follows.

NaY zeolite, industrial product, Si/Al ratio>4.7, crystallinity>85%, available from Sinopec Catalyst Company, Qilu Division.

Mixed rare earth chloride (also hereinafter called as rare earth chloride for short), industrial grade, specification: per liter, containing lanthanum (as $La_2O_3$) 153 g and cerium (as $Ce_2O_3$) 69 g, available from Sinopec Catalyst Company, Qilu Division.

Ammonium sulfate, chemically pure

Phosphoric acid, chemically pure

Ammonium dihydrogen phosphate, chemically pure

Sulphuric acid, chemically pure

Oxalic acid, solid, chemically pure

Fluorosilicic acid, chemically pure

Hydrochloric acid, chemically pure

The Preparation of the Modified Y-Type Zeolite

Example 1

First exchanging: using a NaY zeolite as starting material and exchanging with an ammonium sulfate solution. The NaY zeolite, ammonium sulfate and water were mixed in a weight ratio of the NaY zeolite (dry basis):ammonium sulfate:water=1:1:8. The resulting mixture was adjusted with sulfuric acid to a pH of 3.5, exchanged at 85° C. for 1 hour, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing rare earth. The firstly calcined zeolite, rare earth chloride and water were mixed in a weight ratio of firstly calcined zeolite (dry basis):rare earth chloride (as $RE_2O_3$):water=1:0.042:8. The mixture was subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 580° C. in a condition of 100% steam or 2 hours to obtain a secondly calcined zeolite.

Third exchanging: treating the secondly calcined zeolite with a solution containing phosphoric acid and oxalic acid. The secondly calcined zeolite, phosphoric acid, oxalic acid (containing two molecules of crystalline water) and water were mixed in a weight ratio of secondly calcined zeolite (dry basis):phosphoric acid (as P):oxalic acid (containing two molecules of crystalline water):water=1:0.014:0.14:8. The resulting mixture was adjusted with sulfuric acid to a pH of 2.8. The mixture was subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 70% steam for 2 hours to obtain a thirdly calcined zeolite, i.e. the modified zeolite, also called as zeolite A1.

The properties of the modified zeolite were listed in Table 0.

Comparative Example 1

The preparation of the modified Y-type zeolite according to the method disclosed in CN 101537366A 100 g (dry basis) of NaY zeolite was poured into a reactor containing 1000 g of an exchanging solution (containing 0.63% $(NH_4)_2HPO_4$ and 8.58% $NH_4Cl$). The exchange was conducted at 90° C. for 1 hour, while the solution was controlled at a pH=3.0-3.5 in the exchange course. After the exchange, the filtration and washing was conducted. After calcining at 730° C. in a condition of 100% steam for 2 hours, the calcined substance was poured into a reactor containing 1200 g of an exchanging solution (containing 0.58% $RECl_3$ and 6.8% $NH_4Cl$). The exchange was conducted at 90° C. for 1 hour, while the solution was controlled at a pH=6.0-6.5 in the exchange course. After the exchange, the filtration and washing was conducted. After calcining at 730° C. in a condition of 70% steam for 2 hours, a modified zeolite, i.e. zeolite 81, was obtained. The properties of the modified zeolite were listed in Table 0.

Example 2

First exchanging: using a NaY zeolite as starting material and exchanging with an ammonium chloride solution. The NaY zeolite, ammonium chloride and water were mixed in a weight ratio of the NaY zeolite (dry basis):ammonium chloride:water=1:0.8:8. The resulting mixture was adjusted with hydrochloric acid to a pH of 4.0, exchanged at 90° C. for 1 hour, filtered, and washed with deionized water to obtain a firstly exchanged zeolite.

First calcination: a hydrothermal calcination treatment. The firstly exchanged zeolite was calcined at 550° C. in a condition of 80% steam for 2 hours to obtain a firstly calcined zeolite.

Second exchanging: treating the firstly calcined zeolite with a solution containing phosphoric acid and fluorosilicic acid. The firstly calcined zeolite, phosphoric acid, fluorosilicic acid, and water were mixed in a weight ratio of firstly calcined zeolite (dry basis):phosphoric acid (as P):fluorosilicic acid:water 1:0.01:0.03:8. The mixture was adjusted with hydrochloric acid to a pH of 2.8, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 70% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.03:8. The mixture was subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 100% steam for 2 hours to obtain a thirdly calcined zeolite, i.e. the modified zeolite, also called as zeolite A2.

The properties of the modified zeolite were listed in Table 0.

Comparative Example 2

The preparation of the modified Y-type zeolite according to the method disclosed in CN 101537366A 100 g (dry basis) of NaY zeolite was poured into a reactor containing 900 g of an exchanging solution (containing 0.45% $(NH_4)_2HPO_4$ and 10% $(NH_4)_2SO_4$). The exchange was conducted at 90° C. for 1 hour, while the solution was controlled at a pH=3.0-3.5 in the exchange course. After the exchange, the filtration and washing was conducted. After calcining at 730° C. in a condition of 100% steam for 2 hours, the calcined substance was poured into a reactor containing 1200 g of an exchanging solution (containing 0.44% $RECl_3$ and 7.8% $NH_4Cl$). The exchange was conducted at 90° C. for 1 hour, while the solution was controlled at a pH=6.0-6.5 in the exchange course. After the exchange, the filtration and washing was conducted. After calcining at 730° C. in a condition of 100% steam for 2 hours, a modified zeolite, i.e. zeolite B2, was obtained. The properties of the modified zeolite were listed in Table 0.

Example 3

First exchanging: using a NaY zeolite as starting material and exchanging with an ammonium sulfate solution. The NaY zeolite, ammonium sulfate and water were mixed in a weight ratio of the NaY zeolite (dry basis):ammonium sulfate:water=1:1:10. The resulting mixture was adjusted with sulfuric acid to a pH of 3.5, exchanged at 90° C. for 2 hours, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing a phosphate salt and oxalic acid. The firstly calcined zeolite, diammonium hydrogen phosphate, oxalic acid and water were mixed in a weight ratio of firstly calcined zeolite (dry basis):diammonium hydrogen phosphate (as P):oxalic acid:water=1:0.018:0.18:8. The resulting mixture was adjusted with hydrochloric acid to a pH of 2.8, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 100% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.02:8. The mixture was subjected to an exchange at 85° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 580° C. in a condition of 100% steam for 2 hours to obtain a thirdly calcined zeolite, i.e. the modified zeolite, also called as zeolite A3.

The properties of the modified zeolite were listed in Table 0.

Comparative Example 3

The preparation of the modified Y-type zeolite according to the method disclosed in CN 101537366A 100 g (dry basis) of NaY zeolite was poured into a reactor containing 1000 g of an exchanging solution (containing 0.63% $(NH_4)_2HPO_4$ and 10% $(NH_4)_2SO_4$). The exchange was conducted at 90° C. for 1 hour, while the solution was controlled at a pH=3.0-3.5 in the exchange course. After the exchange, the filtration and washing was conducted. After calcining at 670° C. in a condition of 100% steam for 2 hours, the calcined substance was poured into a reactor containing 400 g of an exchanging solution (containing 0.60% $RECl_3$ and 6.8% $NH_4Cl$). The exchange was conducted at 90° C. for 1 hour, while the solution was controlled at a pH=6.0-6.5 in the exchange course. After the exchange, the filtration and washing was conducted. After calcining at 700° C. in a condition of 100% steam for 2 hours, a modified zeolite, i.e. zeolite B3, was obtained. The properties of the modified zeolite were listed in Table 0.

Example 4

First exchanging: using a NaY zeolite as starting material and exchanging with a solution containing a phosphate salt and ammonium sulfate. The NaY zeolite, ammonium dihydrogen phosphate, ammonium sulfate and water were mixed in a weight ratio of NaY zeolite (dry basis):ammonium dihydrogen phosphate (as P):ammonium sulfate:water=1:0.05:1:8. The resulting mixture was adjusted with sulfuric acid to a pH of 3.0, exchanged at 85° C. for 1 hour, filtered, and washed with deionized water to obtain a firstly exchanged zeolite.

First calcination: a hydrothermal calcination treatment. The firstly exchanged zeolite was calcined at 580° C. in a condition of 100% steam for 2 hours to obtain a firstly calcined zeolite.

Second exchanging: treating the firstly calcined zeolite with a solution containing oxalic acid. The firstly calcined zeolite, oxalic acid and water were mixed in a weight ratio of firstly calcined zeolite (dry basis):oxalic acid:water=1:0.2:8. The resulting mixture was adjusted with sulfuric acid to a pH of 2.4, and subjected to an exchange at 70° C. for 1 hour, filtered, washed with deionized water (water temperature≥50° C.) to obtain a secondly exchanged zeolite.

Second calcination: a hydrothermal calcination treatment. The secondly exchanged zeolite was calcined at 550° C. in a condition of 100% steam for 2 hours to obtain a secondly calcined zeolite.

Third exchanging: treating the secondly calcined zeolite with a solution containing rare earth. The secondly calcined zeolite, rare earth chloride and water were mixed in a weight ratio of secondly calcined zeolite (dry basis):rare earth chloride (as $RE_2O_3$):water=1:0.01:8. The mixture was subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 600° C. in a condition of 100% steam for 2 hours to obtain a thirdly calcined zeolite, i.e. the modified zeolite, also called as zeolite A4.

The properties of the modified zeolite were listed in Table 0.

Comparative Example 4

The preparation of the modified Y-type zeolite according to the method disclosed in CN 101537366A 100 g (dry basis) of NaY zeolite was poured into a reactor containing 1200 g of an exchanging solution (containing 1.22% $(NH_4)_2HPO_4$ and 8.58% $NH_4Cl$). The exchange was conducted at 90° C. for 1 hour, while the solution was controlled at a pH=5.0-5.5 in the exchange course. After the exchange, the filtration and washing was conducted. After calcining at 620° C. in a condition of 100% steam for 2 hours, the calcined substance was poured into a reactor containing 1200 g of an exchanging solution (containing 0.055% RECD and 7.8% $NH_4Cl$). The exchange was conducted at 90° C. for 1 hour, while the solution was controlled at a pH=6.0-6.5 in the exchange course. After the exchange, the filtration and washing was conducted. After calcining at 700° C. in a condition of 100% steam for 2 hours, a modified zeolite, i.e. zeolite B4, was obtained. The properties of the modified zeolite were listed in Table 0.

Example 5

First exchanging: using a NaY zeolite as starting material and exchanging with a solution containing a phosphate salt and ammonium sulfate. The NaY zeolite, ammonium dihydrogen phosphate, ammonium sulfate and water were mixed in a weight ratio of NaY zeolite (dry basis):ammonium dihydrogen phosphate (as P):ammonium sulfate:water=1:0.05:1:8. The resulting mixture was adjusted with sulfuric acid to a pH of 3.5, exchanged at 90° C. for 2 hours, filtered, and washed with deionized water to obtain a firstly exchanged zeolite.

First calcination: a hydrothermal calcination treatment. The firstly exchanged zeolite was calcined at 550° C. in a condition of 100% steam for 2 hours to obtain a firstly calcined zeolite.

Second exchanging: treating the firstly calcined zeolite with a solution containing rare earth. The firstly calcined zeolite, rare earth chloride and water were mixed in a weight ratio of firstly calcined zeolite (dry basis):rare earth chloride (as $RE_2O_3$):water=1:0.02:8. The resulting mixture was subjected to an exchange at 85° C. for 1 hour, filtered, washed with deionized water (water temperature≥50° C.) to obtain a secondly exchanged zeolite.

Second calcination: a hydrothermal calcination treatment. The secondly exchanged zeolite was calcined at 580° C. in a condition of 100% steam for 2 hours to obtain a secondly calcined zeolite.

Third exchanging: treating the secondly calcined zeolite with a solution containing a phosphate salt and fluorosilicic acid. The secondly calcined zeolite, diammonium hydrogen phosphate, fluorosilicic acid and water were mixed in a weight ratio of secondly calcined zeolite (dry basis):diammonium hydrogen phosphate (as P):fluorosilicic acid:water=1:0.006:0.03:8. The mixture was adjusted with hydrochloric acid to a pH of 3.0, and subjected to an exchange at 70° C. for 1 hour, filtered, washed with deionized water (water temperature≥50° C.) to obtain a thirdly exchanged zeolite.

Third calcination: a hydrothermal calcination treatment. The thirdly exchanged zeolite was calcined at 550° C. in a condition of 100% steam for 2 hours to obtain a thirdly calcined zeolite, i.e. the modified zeolite, also called as zeolite A5.

The properties of the modified zeolite were listed in Table 0.

Comparative Example 5

The preparation of the modified Y-type zeolite according to the method disclosed in CN 101537366A 100 g (dry basis) of NaY zeolite was poured into a reactor containing 1500 g of an exchanging solution (containing 1.11% $(NH_4)_2HPO_4$ and 8.58% $NH_4Cl$). The exchange was conducted at 90° C. for 1 hour, while the solution was controlled at a pH=4.5-5.0 in the exchange course. After the exchange, the filtration and washing was conducted. After calcining at 650° C. in a condition of 100% steam for 2 hours, the calcined substance was poured into a reactor containing 1000 g of an exchanging solution (containing 0.35% $RECl_3$ and 7.8% $NH_4Cl$). The exchange was conducted at 90° C. for 1 hour, while the solution was controlled at a pH=6.0-6.5 in the exchange course. After the exchange, the filtration and washing was conducted. After calcining at 700° C. in a condition of 70% steam for 2 hours, a modified zeolite, i.e. zeolite B-5, was obtained. The properties of the modified zeolite were listed in Table 0.

TABLE 0

| | Unit cell size (nm) | Weight loss percent | | | Crystallinity | Element Mass Fraction | | | Specific hydroxy nest concentration (mmol/g) |
| | | $M_{200° C.}$ | $M_{500° C.}$ | $M_{800° C.}$ | | P | $RE_2O_3$ | $Al_2O_3$ | |
|---|---|---|---|---|---|---|---|---|---|
| Example 1 | 2.438 | 13.2% | 14.63% | 15.23% | 56% | 1.0% | 3.6% | 18.5% | 0.17 |
| Comparative Example 1 | 2.440 | 12.79% | 14.45% | 14.97% | 45% | 1.1% | 3.4% | 23.1% | 0.48 |
| Example 2 | 2.437 | 10.45% | 11.79% | 12.36% | 57% | 0.7% | 2.7% | 19.2% | 0.14 |
| Comparative Example 2 | 2.438 | 11.30% | 13.00% | 13.51% | 45% | 0.6% | 2.5% | 23.4% | 0.51 |
| Example 3 | 2.436 | 14.46% | 15.86% | 16.43% | 55% | 1.5% | 1.6% | 17.9% | 0.19 |
| Comparative Example 3 | 2.438 | 13.51% | 15.20% | 15.73% | 49% | 1.3% | 1.54% | 23.1% | 0.45 |
| Example 4 | 2.429 | 12.62% | 14.07% | 14.58% | 53% | 4.0% | 0.4% | 18.2% | 0.29 |
| Comparative Example 4 | 2.438 | 14.98% | 16.56% | 17.10% | 48% | 4.0% | 0.3% | 22.6% | 038 |
| Example 5 | 2.435 | 12.57% | 14.07% | 14.66% | 55% | 4.5% | 1.7% | 16.8% | 0.22 |
| Comparative Example 5 | 2.438 | 13.18% | 14.83% | 15.37% | 47% | 4.5% | 1.8% | 22.3% | 0.43 |

Example 6

This example illustrates the structure-hydrothermal stability of the modified Y-type zeolite of the present invention.

Figure 2:
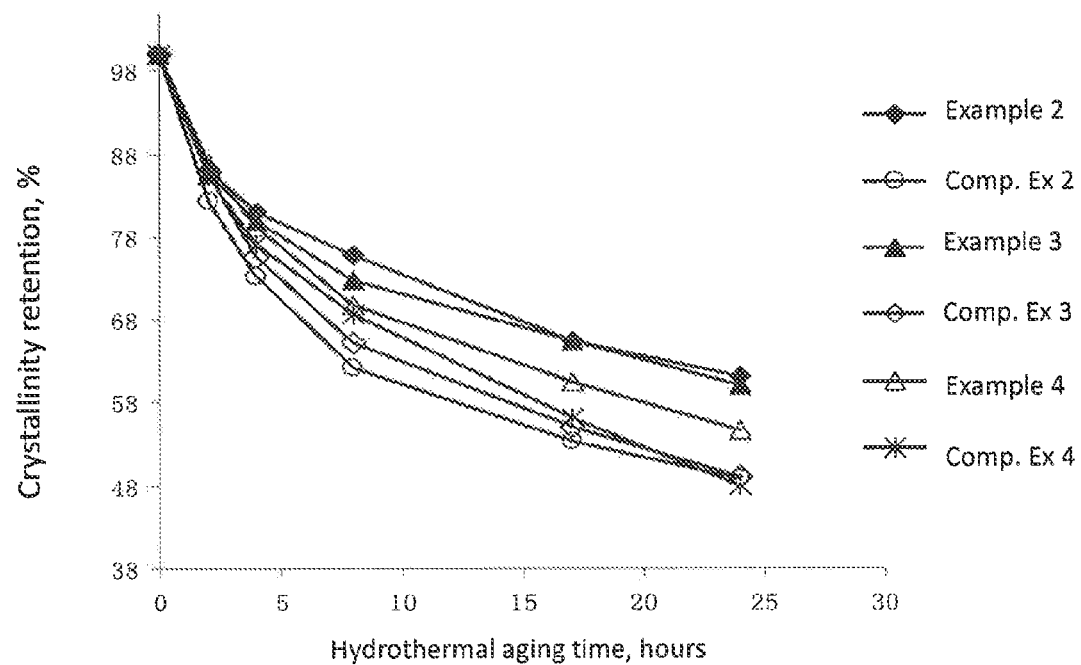
FIG. 2 shows a curve for comparing the data about the crystallinity retention between the Example and the Comparative Example.

The samples prepared in the above Examples 2-4 and Comparative Examples 2-4 were subjected to hydrothermal aging treatments for 2 hours, 4 hours, 8 hours, 17 hours and 24 hours at 800° C. in a condition of 100% steam. The aged samples were measured for crystallinity. The results of crystallinity and crystallinity retention were shown in Table 1, FIG. 1, Table 2 and FIG. 2 respectively.

It can be seen from the above results that the modified Y-type zeolites of the present invention had better crystallinity and better crystallinity retention after the hydrothermal aging treatment under different aging levels than those in the Comparative Examples.

This example demonstrated that the modified Y-type zeolites of the present invention had better structure-hydrothermal stability.

Example 7

This example illustrates the activity-hydrothermal stability and the coke selectivity of the modified Y-type zeolite of the present invention.

The samples prepared in the above Examples 2 and 5 and Comparative Examples 2 and 5 were subjected to hydrothermal aging treatments for 2 hours, 4 hours, 8 hours, 17 hours and 24 hours at 800° C. in a condition of 100% steam. The aged samples were measured for light oil micro-activity (MA) and coke yield, and the coke yield/conversion ratio was also calculated. The results were shown in Table 3, FIG. 3, Table 4 and FIG. 4 respectively.

Figure 3:
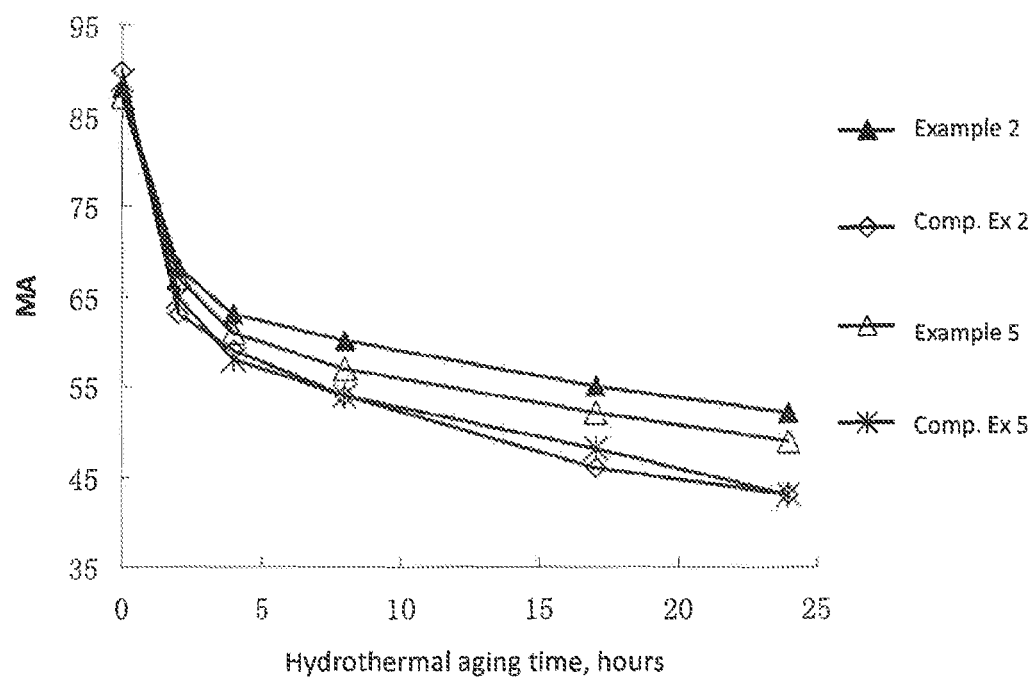
FIG. 3 shows a curve for comparing the data about the activity between the Example and the Comparative Example.

It can be seen from Table 3 and FIG. 3 that, in the rigorous hydrothermal environment, the modified Y-type zeolites of the present invention, after the initial quick deactivation, promptly reached balanced activities, which were remarkably higher than those in Comparative Examples. This showed that the zeolite of the present invention had better activity-stability.

Figure 4:
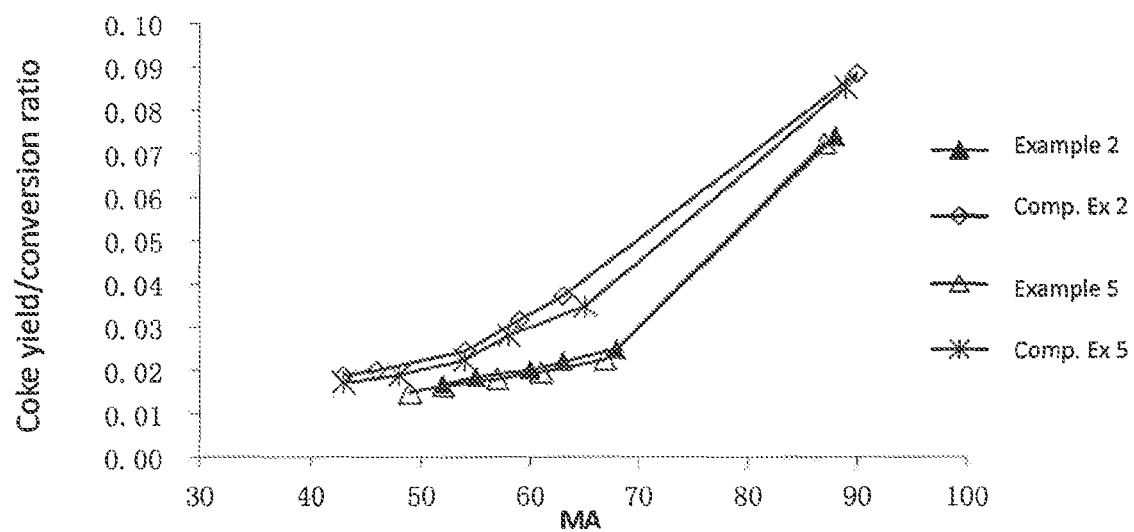
FIG. 4 shows a curve for comparing the data about the coke selectivity between the Example and the Comparative Example.

It can be seen from Table 4 and FIG. 4 that the modified V-type zeolites of the present invention had better coke selectivity than those in Comparative Examples.

TABLE 1

The crystallinity of the zeolite at different aging time-points

| | Crystallinity (%) | | | | | |
|---|---|---|---|---|---|---|
| Aging time/h | 0 | 2 | 4 | 8 | 17 | 24 |
| Example 2 | 57 | 56 | 47 | 44 | 38 | 36 |
| Comparative Example 2 | 45 | 37 | 33 | 28 | 24 | 22 |
| Example 3 | 55 | 47 | 44 | 40 | 36 | 33 |
| Comparative Example 3 | 49 | 42 | 37 | 32 | 27 | 24 |
| Example 4 | 53 | 46 | 42 | 37 | 32 | 29 |
| Comparative Example 4 | 48 | 41 | 37 | 33 | 27 | 23 |

TABLE 2

The crystallinity retention of the zeolite at different aging time-points

| | Crystallinity retention (%) | | | | | |
|---|---|---|---|---|---|---|
| Aging time/h | 0 | 2 | 4 | 8 | 17 | 24 |
| Example 2 | 100 | 87 | 82 | 77 | 66 | 62 |
| Comparative Example 2 | 100 | 82 | 73 | 62 | 53 | 49 |
| Example 3 | 100 | 85 | 80 | 73 | 65 | 60 |
| Comparative Example 3 | 100 | 86 | 76 | 65 | 55 | 49 |
| Example 4 | 100 | 87 | 79 | 70 | 60 | 55 |
| Comparative Example 4 | 100 | 85 | 77 | 69 | 56 | 48 |

TABLE 3

Activity of the zeolite at different aging time-points

| | MA (no unit) | | | | | |
|---|---|---|---|---|---|---|
| Aging time/h | 0 | 2 | 4 | 8 | 17 | 24 |
| Example 2 | 88 | 68 | 63 | 60 | 55 | 52 |
| Comparative Example 2 | 90 | 63 | 59 | 54 | 46 | 43 |
| Example 5 | 87 | 67 | 61 | 56 | 52 | 49 |
| Comparative Example 5 | 89 | 65 | 58 | 54 | 48 | 43 |

TABLE 4

Coke selectivity of the zeolite at different aging time-points

| | Coke yield/conversion ratio (%) | | | | | |
|---|---|---|---|---|---|---|
| Aging time/h | 0 | 2 | 4 | 8 | 17 | 24 |
| Example 2 | 7.4 | 2.5 | 2.2 | 2.0 | 1.8 | 1.7 |
| Comparative Example 2 | 8.8 | 3.7 | 3.1 | 2.5 | 2.0 | 1.9 |
| Example 5 | 7.3 | 2.2 | 2.0 | 1.8 | 1.6 | 1.5 |
| Comparative Example 5 | 8.5 | 3.5 | 2.8 | 2.3 | 1.9 | 1.7 |

The Preparation and Evaluation of the Catalyst

In the following examples for preparing the catalysts, besides the zeolites A1-A5 and B1-B5, the following materials are used.

Kaolin is a product commercially available from China Kaolin Company, Suzhou having a solid content of 78%. The used kaolin slurry has a solid content of 45 wt %.

Pseudoboehmite is a product commercially available from Shandong Aluminum Factory having a solid content of 60 wt %.

Alumina sol is a product commercially available from Sinopec Catalyst Company Qilu Division having an Al2O3 content of 21.5 wt %.

Hereinafter, the acid/alumina ratio refers to the weight ratio of hydrochloric acid having a concentration of 36 wt % to pseudoboehmite as alumina.

Mg-containing ultra stable Y-type zeolite is prepared according to the method disclosed in Example 1 of CN1157465C, and hereinafter called as the zeolite Z1.

REY zeolite is a product commercially available from Sinopec Catalyst Company Qilu Division, having a $RE_2O_3$ content of 12 wt % and a solid content of 85 wt %. Hereinafter, it is also called as the zeolite REY.

ZRP-1 zeolite is a phosphorus- and rare earth-containing MFI-structured zeolite, which is produced by Sinopec Catalyst Company Qilu Division and has a $RE_2O_3$ content of 4%, a phosphorus content of 2%, and a Si/Al ratio of 45. Hereinafter, it is also called as the zeolite ZRP-1.

ZSP-1 zeolite is a phosphorus- and iron-containing MFI-structured zeolite, which is produced by Sinopec Catalyst Company Qilu Division and has a phosphorus content of 1.5 wt % and a Fe2O3 content of 2.5 wt %. Hereinafter, it is also called as the zeolite ZSP-1.

DASY-2.0 zeolite is a product commercially available from Sinopec Catalyst Company Qilu Division, having a solid content of 87 wt % and a $RE_2O_3$ content of 2%. Hereinafter, it is also called as the zeolite DASY-2.0.

Rare earth modified, gas-phase ultra stable Y-type zeolite is prepared according to the method disclosed in Example 5 of CN1286721C, and hereinafter called as the zeolite Z2.

Rare earth-containing, acid-treated, hydrothermally dealuminated Y-type zeolite is prepared according to the method disclosed in Example 1 of CN100497175C, and hereinafter called as the zeolite Z3.

Group I

Catalyst Example 1

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 15 weight parts of the zeolite A1 (on the dry basis), 18 weight parts of the zeolite Z1 (on the dry basis) and 5 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C1.

Catalyst Example 2

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 31 weight parts of the kaolin slurry (on the dry basis), and 10 weight parts of the alumina sol (as alumina). After stirring for 20 minutes, to the mixture were added 30 weight parts of the zeolite A2 (on the dry basis), 1 weight part of the zeolite Z1 (on the dry basis) and 8 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C2.

Catalyst Example 3

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 25 weight parts of the zeolite A3 (on the dry basis), 5 weight parts of the zeolite Z1 (on the dry basis) and 10 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C3.

Catalyst Example 4

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 10 weight parts of the zeolite A4 (on the dry basis), 22 weight parts of the zeolite Z1 (on the dry basis) and 8 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C4.

Catalyst Example 5

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 20 weight parts of the zeolite A5 (on the dry basis), 10 weight parts of the zeolite Z1 (on the dry basis) and 10 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C5.

Catalyst Comparative Example 1-5

The preparation procedures according to Catalyst Examples 1-5 were repeated except that zeolites A1-A5 were replaced with zeolites B1-B5 respectively to obtain catalytic cracking catalysts DC1-DC5.

Catalyst Example 6

The preparation procedure according to Catalyst Example 1 was repeated except that the zeolite REY was not added, and 20 weight parts of the zeolite A1 was added to obtain the catalytic cracking catalyst C6.

Catalyst Comparative Example 6

The preparation procedure according to Catalyst Example 2 was repeated except that neither zeolite A2 nor the zeolite REY was added, but 39 weight parts of the zeolite Z2 was added to obtain the catalytic cracking catalyst DC6.

The above catalytic cracking catalysts C1-C6 and DC1-DC6 were aged at 800° C. in a condition of 100% steam for 12 hours, and then loaded in a fixed fluidised bed (FFB) equipment (provided by Dadi Company, RIPP, Sinopec) to evaluate the reaction performance of the catalytic cracking catalyst. The loading amount of the catalyst was 150 g. Then, the feedstock oil with the properties as shown in Table 1-1 was introduced to the FBB equipment to conduct the catalytic cracking reaction at a temperature of 500° C. at a weight hourly space velocity of 16/h at a catalyst/oil ratio (by weight) of 4. The results were shown in Table 1-2.

TABLE 1-1

| | |
|---|---|
| Density, g/cm³(20° C.) | 0.9171 |
| Viscosity(100° C.), mm²/s | 10.61 |
| Freezing point, ° C. | 20 |
| Residual Carbon, wt % | 1.91 |
| Element content, wt % | |
| C | 85.96 |
| H | 12.37 |
| S | 1.0 |
| N | 0.35 |
| Metal content, μg/g | |
| Ca | 8.3 |
| Fe | 12.3 |
| Na | 0.9 |

TABLE 1-1-continued

| | |
|---|---|
| Ni | 4.7 |
| V | 0.4 |
| Distillation range, ° C. | |
| Initial boiling point | 267 |
| 10% | 371 |
| 50% | 449 |
| 70% | 486 |
| 86.9% | 549 |

TABLE 1-2

| Catalyst | Catalyst Code | Dry gas (C2−) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) |
|---|---|---|---|---|---|---|---|---|
| Example 1 | C1 | 1.72 | 11.24 | 44.32 | 21.23 | 15.94 | 5.55 | 62.83 |
| Comparative Example 1 | DC1 | 1.75 | 11.11 | 43.58 | 20.45 | 17.00 | 6.11 | 62.55 |
| Example 2 | C2 | 1.69 | 11.66 | 45.68 | 20.71 | 16.01 | 4.25 | 63.28 |
| Comparative Example 2 | DC2 | 1.81 | 10.89 | 44.12 | 19.44 | 18.27 | 5.47 | 62.29 |
| Example 3 | C3 | 1.66 | 11.06 | 45.33 | 20.28 | 17.06 | 4.61 | 62.66 |
| Comparative Example 3 | DC3 | 1.75 | 10.75 | 44.07 | 19.01 | 18.69 | 5.73 | 62.30 |
| Example 4 | C4 | 1.68 | 11.09 | 44.29 | 21.17 | 16.16 | 5.61 | 62.67 |
| Comparative Example 4 | DC4 | 1.73 | 10.92 | 44.03 | 20.58 | 16.61 | 6.13 | 62.81 |
| Example 5 | C5 | 1.58 | 10.17 | 44.77 | 19.79 | 18.65 | 5.04 | 61.56 |
| Comparative Example 5 | DC5 | 1.72 | 9.38 | 43.91 | 18.67 | 20.42 | 5.90 | 60.91 |
| Example 6 | C6 | 1.54 | 10.11 | 43.95 | 21.38 | 18.64 | 4.38 | 59.98 |
| Comparative Example 6 | DC6 | 1.67 | 10.01 | 43.91 | 19.94 | 19.98 | 4.49 | 60.08 |

Group II

Catalyst Example 1

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 38 weight parts of the zeolite A1 (on the dry basis), 2 weight parts of the zeolite ZRP-1 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C1.

Catalyst Example 2

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 30 weight parts of the zeolite A2 (on the dry basis), 5 weight parts of the zeolite REY (on the dry basis) and 5 weight parts of the zeolite ZRP-1 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C2.

Catalyst Example 3

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 25 weight parts of the zeolite A3 (on the dry basis), 10 weight parts of the zeolite ZSP-1 (on the dry basis) and 8 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C3.

Catalyst Example 4

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 35 weight parts of the kaolin slurry (on the dry basis), and 10 weight parts of the alumina sol (as alumina). After stirring for 20 minutes, to the mixture were added 15 weight parts of the zeolite A4 (on the dry basis), 10 weight parts of the zeolite ZRP-1 (on the dry basis) and 10 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C4.

Catalyst Example 5

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 15 weight parts of the zeolite A5 (on the dry basis), 15 weight parts of the zeolite ZSP-1 (on the dry basis) and 8 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C5.

Catalyst Comparative Example 1-5

The preparation procedures according to Catalyst Examples 1-5 were repeated except that zeolites A1-A5 were replaced with zeolites B1-B5 respectively to obtain catalytic cracking catalysts DC1-DC5.

Catalyst Comparative Example 6

The preparation procedure according to Catalyst Example 1 was repeated except that the zeolite A1 was replaced with the same amount of the zeolite ZRP-1 to obtain the catalytic cracking catalyst DC6.

The above catalytic cracking catalysts C1-C5 and DC1-DC6 were aged at 800° C. in a condition of 100% steam for 8 hours. The reaction performance of the catalyst was evaluated in a small-scale fixed fluidised bed ACE R+ unit (designed and produced by Kayser Technology Inc. USA). The loading amount of the catalyst was 9 g. Then, the catalytic mixed oil as starting material with the properties as shown in Table 2-1 was introduced to the ACE R+ unit to conduct the catalytic cracking reaction at a temperature of 520° C. at a weight hourly space velocity of 16/h at a catalyst/oil ratio (by weight) of 4. The results were shown in Table 2-2.

TABLE 2-1

| | |
|---|---|
| Density, g/cm³(20° C.) | 0.9055 |
| Viscosity(100° C.), mm²/s | 6.77 |
| Freezing point, ° C. | 38 |
| Residual Carbon, wt % | 0.14 |
| Element content, wt % | |
| C | 86.42 |
| H | 12.48 |
| S | 0.35 |
| N | 0.18 |
| Metal content, μg/g | |
| Ca | 0.8 |
| Fe | 1.6 |
| Na | 3.4 |
| Ni | 0.3 |
| V | <0.1 |
| Distillation range, ° C. | |
| Initial boiling point | 254 |
| 10% | 364 |
| 50% | 441 |
| 70% | 472 |
| 95% | 563 |

TABLE 2-2

| Catalyst | Catalyst Code | Dry gas (C2−) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) | Propylene (wt %) |
|---|---|---|---|---|---|---|---|---|---|
| Example 1 | C1 | 1.18 | 15.62 | 46.78 | 18.75 | 15.18 | 2.49 | 66.07 | 5.22 |
| Comparative Example 1 | DC1 | 1.29 | 14.07 | 45.34 | 17.81 | 17.84 | 3.65 | 64.35 | 4.61 |
| Example 2 | C2 | 1.83 | 19.33 | 44.48 | 17.68 | 13.76 | 2.92 | 68.56 | 6.63 |
| Comparative Example 2 | DC2 | 1.95 | 18.19 | 43.38 | 17.37 | 14.77 | 4.34 | 67.86 | 5.99 |
| Example 3 | C3 | 1.65 | 20.45 | 43.65 | 17.40 | 13.55 | 3.30 | 69.05 | 7.36 |
| Comparative Example 3 | DC3 | 1.85 | 18.39 | 43.13 | 17.26 | 14.79 | 4.58 | 67.95 | 6.37 |
| Example 4 | C4 | 1.41 | 20.36 | 42.43 | 18.24 | 13.95 | 3.61 | 67.81 | 7.08 |
| Comparative Example 4 | DC4 | 1.78 | 18.55 | 41.95 | 17.88 | 14.97 | 4.87 | 67.15 | 6.19 |
| Example 5 | C5 | 2.14 | 25.29 | 38.07 | 16.69 | 14.37 | 3.44 | 68.94 | 9.27 |
| Comparative Example 5 | DC5 | 2.22 | 23.88 | 37.68 | 16.13 | 15.94 | 4.15 | 67.93 | 8.43 |

TABLE 2-2-continued

| Catalyst | Catalyst Code | Dry gas (C2−) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) | Propylene (wt %) |
|---|---|---|---|---|---|---|---|---|---|
| Comparative Example 6 | DC6 | 0.64 | 7.16 | 15.80 | 25.34 | 49.48 | 1.58 | 25.18 | 2.78 |

Group III

Catalyst Example 1

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 35 weight parts of the zeolite A1 (on the dry basis) and 5 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C1.

Catalyst Example 2

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 30 weight parts of the zeolite A2 (on the dry basis) and 8 weight parts of the zeolite REY (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C2.

Catalyst Example 3

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 25 weight parts of the zeolite A3 (on the dry basis), 10 weight parts of the zeolite REY (on the dry basis) and 3 weight parts of the zeolite DASY-2.0 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C3.

Catalyst Example 4

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 20 weight parts of the zeolite A4 (on the dry basis), 12 weight parts of the zeolite REY (on the dry basis) and 6 weight parts of the zeolite DASY-2.0 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C4.

Catalyst Example 5

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 32 weight parts of the kaolin slurry (on the dry basis), and 10 weight parts of the alumina sol (as alumina). After stirring for 20 minutes, to the mixture were added 15 weight parts of the zeolite A5 (on the dry basis), 10 weight parts of the zeolite REY (on the dry basis) and 13 weight parts of the zeolite DASY-2.0 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C5.

Catalyst Comparative Example 1-5

The preparation procedures according to Catalyst Examples 1-5 were repeated except that zeolites A1-A5 were replaced with zeolites B1-85 respectively to obtain catalytic cracking catalysts DC1-DC5.

Catalyst Example 6

The preparation procedure according to Catalyst Example 1 was repeated except that only the zeolite A1 was used and the zeolite REY was not added, wherein the zeolite REY was replaced with the same amount of the zeolite A1 to obtain the catalytic cracking catalyst C6.

The above catalytic cracking catalysts C1-C6 and DC1-DC5 were aged at 800° C. in a condition of 100% steam for 12 hours. The reaction performance of the catalyst was evaluated in a small-scale fixed fluidised bed ACE R+ unit (designed and produced by Kayser Technology Inc. USA). The loading amount of the catalyst was 9 g. Then, the catalytic mixed oil as starting material with the properties as shown in Table 3-1 was introduced to the ACE R+ unit to conduct the catalytic cracking reaction at a temperature of 500° C. at a weight hourly space velocity of 16/h at a catalyst/oil ratio (by weight) of 8. The results were shown in Table 3-2.

TABLE 3-1

| Density, g/cm³(20° C.) | 0.9044 |
| Viscosity(100° C.), mm²/s | 9.96 |
| Freezing point, ° C. | 40 |
| Residual Carbon, wt % | 3.0 |
| Element content, wt % | |
| C | 85.98 |
| H | 12.86 |
| S | 0.55 |
| N | 0.18 |
| Metal content, μg/g | |
| Ca | 28 |
| Fe | 15.7 |

TABLE 3-1-continued

| Na | 3.4 |
| Ni | 7.4 |
| V | 1.2 |
| Distillation range, ° C. | |
| Initial boiling point | 243 |
| 10% | 316 |
| 50% | 429 |
| 70% | 473 |

TABLE 3

| Catalyst | Catalyst Code | Dry gas (C2−) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) | Coke yield/conversion ratio |
|---|---|---|---|---|---|---|---|---|---|
| Example 1 | C1 | 1.11 | 11.52 | 47.53 | 17.80 | 16.96 | 5.08 | 65.24 | 0.0779 |
| Comparative Example 1 | DC1 | 1.20 | 10.27 | 45.85 | 17.46 | 19.03 | 6.19 | 63.51 | 0.0975 |
| Example 2 | C2 | 1.01 | 11.54 | 46.11 | 18.79 | 17.57 | 4.98 | 63.64 | 0.0783 |
| Comparative Example 2 | DC2 | 1.13 | 10.36 | 44.90 | 18.19 | 19.47 | 5.95 | 62.34 | 0.0954 |
| Example 3 | C3 | 1.15 | 12.60 | 47.18 | 18.31 | 14.79 | 5.97 | 66.90 | 0.0892 |
| Comparative Example 3 | C3 | 1.43 | 10.83 | 45.43 | 18.06 | 17.11 | 7.14 | 64.83 | 0.1101 |
| Example 4 | C4 | 1.19 | 11.97 | 48.19 | 17.87 | 14.71 | 6.07 | 67.42 | 0.0900 |
| Comparative Example 4 | DC4 | 1.31 | 10.96 | 45.99 | 17.72 | 16.77 | 7.25 | 65.51 | 0.1107 |
| Example 5 | C5 | 1.31 | 2.64 | 48.57 | 17.45 | 13.62 | 6.41 | 68.93 | 0.0930 |
| Comparative Example 5 | DC5 | 1.29 | 12.05 | 46.66 | 17.30 | 15.17 | 7.53 | 67.53 | 0.1115 |
| Example 6 | C6 | 0.94 | 11.37 | 45.94 | 18.69 | 16.26 | 4.78 | 63.03 | 0.0758 |

Group IV

Catalyst Example 1

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 35 weight parts of the zeolite A1 (on the dry basis), 5 weight parts of the zeolite Z2 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C1.

Catalyst Example 2

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 25 weight parts of the zeolite A2 (on the dry basis), 13 weight parts of the zeolite Z2 (on the dry basis) and 2 weight parts of the zeolite Z3 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C2.

Catalyst Example 3

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 15 weight parts of the zeolite A3 (on the dry basis), 25 weight parts of the zeolite Z3 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C3.

Catalyst Example 4

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 28 weight parts of the kaolin slurry (on the dry basis), and 10 weight parts of the alumina sol (as alumina). After stirring for 20 minutes, to the mixture were added 40 weight parts of the zeolite A4 (on the dry basis), 2 weight parts of the zeolite Z2 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution:microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C4.

Catalyst Example 5

20 weight parts of pseudoboehmite (as alumina) and deionized water were mixed and pulped to obtain a slurry. To the resulting slurry was added hydrochloric acid (having a concentration of 36 wt %) with an acid/alumina ratio of 0.20 to peptize. The mixture was warmed up to 65° C. and acidified for 1 hour. To the resulting mixture were respectively added 30 weight parts of the kaolin slurry (on the dry basis), and 10 weight parts of the alumina sol (as alumina). After stirring for 20 minutes, to the mixture were added 5 weight parts of the zeolite A5 (on the dry basis), 30 weight parts of the zeolite Z3 (on the dry basis) and 5 weight parts of the zeolite DASY-2.0 (on the dry basis). After continuing to stir, the resulting mixture was spray-dried to produce the microsphere catalyst. The microsphere catalyst was calcined at 500° C. for 1 hour. Then the microsphere catalyst was washed with a $(NH_4)_2SO_4$ solution at 60° C. ($(NH_4)_2SO_4$ solution: microsphere catalyst:$H_2O$=0.04:1:10 weight ratio) until the $Na_2O$ content was less than 0.25 wt %. Finally, the catalyst was rinsed with deionized water, filtered, and dried at 120° C. to obtain the catalytic cracking catalyst C5.

Catalyst Comparative Example 1-5

The preparation procedures according to Catalyst Examples 1-5 were repeated except that zeolites A1-A5 were replaced with zeolites B1-B5 respectively to obtain catalytic cracking catalysts DC1-DC5.

Catalyst Comparative Example 6

The preparation procedure according to Catalyst Example 1 was repeated except that the zeolite A1 was replaced with the same amount of the zeolite Z3 to obtain the catalytic cracking catalyst DC6.

The above catalytic cracking catalysts C1-C5 and DC1-DC6 were aged at 800° C. in a condition of 100% steam for 8 hours. The reaction performance of the catalyst was evaluated in a small-scale fixed fluidised bed ACE R+ unit (designed and produced by Kayser Technology Inc. USA). The loading amount of the catalyst was 9 g. Then, the catalytic mixed oil as starting material with the properties as shown in Table 4-1 was introduced to the ACE R+ unit to conduct the catalytic cracking reaction at a temperature of 518° C. at a weight hourly space velocity of 16/h at a catalyst/oil ratio (by weight) of 5.5. The results were shown in Table 4-2.

TABLE 4-1

| | |
|---|---|
| Density, g/cm$^3$(20° C.) | 0.8994 |
| Viscosity(100° C.), mm$^2$/s | 5.63 |
| Freezing point, ° C. | 34 |
| Residual Carbon, wt % | 0.25 |
| Element content, wt % | |
| C | 87.08 |
| H | 12.57 |
| S | 0.23 |
| N | 0.12 |
| Metal content, μg/g | |
| Ca | 0.4 |
| Fe | 0.2 |
| Na | 0.6 |
| Ni | <0.1 |
| V | <0.1 |
| Distillation range, ° C. | |
| Initial boiling point | 265 |
| 10% | 333 |
| 50% | 426 |
| 70% | 470 |
| 95% | 564 |

TABLE 4-2

| Catalyst | Catalyst Code | Dry gas (C2−) (wt %) | LPG (C3-C4) (wt %) | FCCN (C5-430° F.) (wt %) | LCO (430° F.-650° F.) (wt %) | Bottoms (650° F.+) (wt %) | Coke (wt %) | 430° F. Conversion (wt %) | FCCN Sel. (wt %) | Coke Sel. (wt %) |
|---|---|---|---|---|---|---|---|---|---|---|
| Example 1 | C1 | 1.24 | 12.45 | 56.51 | 17.02 | 9.65 | 3.13 | 73.33 | 77.06 | 4.27 |
| Comparative Example 1 | DC1 | 1.45 | 11.69 | 54.25 | 15.82 | 12.41 | 4.38 | 71.77 | 75.59 | 6.10 |
| Example 2 | C2 | 1.33 | 12.22 | 55.97 | 17.65 | 9.32 | 3.51 | 73.03 | 76.64 | 4.81 |
| Comparative Example 2 | DC2 | 1.52 | 11.66 | 53.66 | 16.18 | 12.22 | 4.76 | 71.60 | 74.94 | 6.65 |
| Example 3 | C3 | 1.41 | 12.05 | 55.20 | 18.01 | 9.34 | 3.99 | 72.65 | 75.98 | 5.49 |
| Comparative Example 3 | DC3 | 1.59 | 11.61 | 53.01 | 16.48 | 12.17 | 5.14 | 71.35 | 74.30 | 7.20 |
| Example 4 | C4 | 1.02 | 11.11 | 52.39 | 19.40 | 13.24 | 2.84 | 67.36 | 77.78 | 4.22 |
| Comparative Example 4 | DC4 | 1.14 | 10.77 | 50.23 | 17.23 | 16.52 | 4.11 | 66.25 | 75.82 | 6.20 |
| Example 5 | C5 | 1.71 | 12.38 | 55.48 | 17.11 | 8.74 | 4.58 | 74.15 | 74.82 | 6.18 |
| Comparative Example 5 | DC5 | 1.83 | 11.58 | 53.40 | 16.16 | 11.58 | 5.45 | 72.26 | 73.90 | 7.54 |
| Comparative Example 6 | DC6 | 2.09 | 14.03 | 56.14 | 15.15 | 7.06 | 5.53 | 77.79 | 72.17 | 7.11 |

What is claimed is:

1. A catalytic cracking catalyst, which comprises a cracking active component, 10 wt %-70 wt % of a clay on the dry basis, and 10 wt %-40 wt % of an inorganic oxide binder (as oxide), relative to the weight of the catalytic cracking catalyst, wherein said cracking active component contains, relative to the weight of the catalytic cracking catalyst, 10 wt %-50 wt % of a modified Y-type zeolite on the dry basis and 0-40 wt % of other zeolite on the dry basis, wherein said modified Y-type zeolite is characterized by having a unit cell size of 2.420-2.440 nm;

as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g, said specific hydroxy nest concentration =

$$\frac{[(M_{500°\ C.} - M_{200°\ C.}) - (17/9) \times (M_{800°\ C.} - M_{500°\ C.})] \times 1000}{36 \times (1 - M_{200°\ C.}) \times C} \text{ (Unit: mmol/g)}$$

wherein $M_{200°\ C.}$, $M_{500°\ C.}$ and $M_{800°\ C.}$ respectively represent the weight loss percents of a sample measured at 200° C., 500° C. and 800° C., and C is the crystallinity of the sample;

wherein said other zeolite is selected from one or more of the following:

Y-type zeolite selected from REY, REHY, DASY, USY, and REUSY;

Mg-containing ultra stable Y-type zeolite;

rare-earth modified, gas-phase ultra stable Y-type zeolite and rare earth-containing, acid-treated, hydrothermally dealuminated Y-type zeolite;

MFI-structured zeolite selected from ZSM-5, ZRP, and ZSP; Beta zeolite; and non-zeolite molecular sieve selected from SAPO and a titanium silicate molecular sieve.

2. The catalytic cracking catalyst according to claim 1, wherein said unit cell size is 2.428-2.438 nm; as percent by weight of the modified Y-type zeolite, the phosphorus content is 0.1-4.5%, the $RE_2O_3$ content is 0.1-4.5%, the alumina content is less than 21%; the specific hydroxy nest concentration is less than 0.3 mmol/g and more than 0.10 mmol/g.

3. The catalytic cracking catalyst according to claim 1, wherein said clay is selected from the group consisting of kaolin, metahalloysite, montmorillonite, diatomite, halloysite, saponite, rectorite, sepiolite, attapulgite, hydrotalcite, bentonite and any mixture thereof;

wherein said inorganic oxide binder is an alumina binder.

4. The catalytic cracking catalyst according to claim 1, wherein said other zeolite is selected from one or more of the following:

Y-type zeolite selected from REY, REHY, DASY, USY, and REUSY;

MFI-structured zeolite selected from ZSM-5, ZRP, and ZSP;

Beta zeolite; and non-zeolite molecular sieve selected from SAPO and a titanium silicate molecular sieve.

5. The catalytic cracking catalyst according to claim 1, wherein, relative to the weight of the catalytic cracking catalyst, said catalytic cracking catalyst comprises:

10 wt %-70 wt % of the clay on the dry basis;

10 wt %-40 wt % of the inorganic oxide binder (as oxide); and the cracking active component wherein said cracking active component comprises:

(A) 10 wt %-50 wt % of the modified Y-type zeolite on the dry basis;

(B) optionally, one or more of the following:

(1) not more than 30 wt % of MFI-structured zeolite on the dry basis;

(2) not more than 30 wt % of Mg-containing ultra stable Y-type zeolite on the dry basis;

(3) on the dry basis, not more than 30 wt % of rare earth modified, gas-phase ultra stable Y-type zeolite and/or rare earth-containing, acid-treated, hydrothermally dealuminated Y-type zeolite; and (C) optionally, (4) on the dry basis, not more than 30 wt % of Y-type zeolite selected from the group consisting of REY, REHY, DASY, USY, REUSY and any mixture thereof, wherein, the total weight of the above (1), (2), (3) and (4) is not more than 40 wt %.

6. The catalytic cracking catalyst according to claim 1, wherein said modified Y-type zeolite is prepared by the following process, wherein the modified Y-type zeolite is obtained by using a NaY zeolite as starting material and through three exchange steps in which a rare earth-containing substance and a phosphorus-containing substance are used and three hydrothermally treating steps, wherein, the introduction of phosphorus and rare earth is done by the exchange step;

wherein independently in each exchange step, the zeolite is added to a phosphorus-containing exchanging solution or a rare earth-containing exchanging solution; wherein phosphorus is introduced at any exchange step; and wherein rare earth is introduced at any exchange step except the first exchange step.

7. The catalytic cracking catalyst according to claim 6, said process further comprises: a dealumination agent is introduced at any exchange step except the first exchange step.

8. The catalytic cracking catalyst according to claim 6, wherein said phosphorus-containing substance is selected from the group consisting of orthophosphoric acid, phosphorous acid, pyrophosphoric acid, ammonium phosphate, diammonium hydrogen phosphate, ammonium dihydrogen phosphate, aluminum phosphate, and any mixture thereof.

9. The catalytic cracking catalyst according to claim 6, wherein said rare earth-containing substance is selected from the group consisting of lanthanum oxide, cerium oxide, lanthanum nitrate, cerium nitrate, lanthanum chloride, cerium chloride, a mixed rare earth nitrate, a mixed rare earth chloride, and any mixture thereof.

10. The catalytic cracking catalyst according to claim 7, wherein said dealumination agent is selected from the group consisting of ethylene diamine tetraacetic acid, oxalic acid, citric acid, sulfosalicylic acid, fluorosilicic acid, hydrochloric acid, sulphuric acid, nitric acid, ammonium oxalate, ammonium fluoride, ammonium fluorosilicate, ammonium fluoroborate, and any mixture thereof.

11. The catalytic cracking catalyst according to claim 6, which further comprises: each of the exchange steps is conducted at 60-100° C. for at least 0.5 hour.

12. The catalytic cracking catalyst according to claim 6, wherein each of the hydrothermally treating steps is independently conducted at 350-650° C. in a condition of 1-100% steam for at least 0.5 hour.

13. The catalytic cracking catalyst according to claim 6, which is characterized in that said process comprises the following steps:

1) a NaY zeolite is mixed with an ammonium salt, an ammonium phosphate salt and water in a ratio of the NaY zeolite:the ammonium salt:the ammonium phosphate salt:water=1:[0.4-1]:[0-0.04]:[5-10] to obtain a slurry, the slurry is adjusted with an inorganic acid to a pH of 3.0-4.5, then the slurry is treated at 70-95° C. for at least 0.5 hour, and then washed, wherein, the NaY zeolite is on the dry basis, the ammonium phosphate salt is based on the elemental phosphorus;

2) the product obtained in the step 1) is calcined at 350-650° C. in a condition of 1-100% steam for at least 0.5 hour to obtain a firstly calcined zeolite;

3) the firstly calcined zeolite obtained in the step 2), phosphoric acid, an dealumination agent and water are mixed in a ratio of the firstly calcined zeolite:phosphoric acid:the dealumination agent:water=1:[0-0.04]: [0.02-0.3]:[5-10], the resulting mixture is adjusted with an inorganic acid to a pH of 2.3-3.5, then treated at 50-90° C. for at least 0.5 hour, filtered and washed (washing temperature≥50° C.), wherein, the firstly calcined zeolite is on the dry basis, and phosphoric acid is based on the elemental phosphorus;

4) the product obtained in the step 3) is calcined at 350-650° C. in a condition of 1-100% steam for at least 0.5 hour to obtain a secondly calcined zeolite;

5) the secondly calcined zeolite obtained in the step 4) is mixed with a (mixed) rare earth chloride and water in a ratio of the secondly calcined zeolite:the rare earth chloride:water=1:[0.01-0.05]:[5-10], the resulting mixture is then treated at 70-90° C. for at least 0.5 hour, filtered and washed (washing temperature≥50° C.), wherein, the secondly calcined zeolite is on the dry basis, and the rare earth chloride is based on $RE_2O_3$;

6) the product obtained in the step 5) is calcined at 350-650° C., in a condition of 1-100% steam for at least 0.5 hour to obtain a modified Y-type zeolite.

14. A process for preparing a catalytic cracking catalyst, which process comprises: preparing a slurry containing an cracking active component, a clay and a binder; and spray-drying the prepared slurry, wherein said cracking active component contains a modified Y-type zeolite and other zeolite, wherein per 100 weight parts of the catalytic cracking catalyst, using 10-70 weight parts of the clay on the dry basis, 10-40 weight parts of the inorganic oxide binder (as oxide), 10-50 weight parts of the modified Y-type zeolite on the dry basis, and 0-40 weight parts of other zeolite on the dry basis to prepare said slurry, wherein said modified Y-type zeolite is characterized by having a unit cell size of 2.420-2.440 nm; as percent by weight of the modified Y-type zeolite, a phosphorus content of 0.05-6%, a $RE_2O_3$ content of 0.03-10%, and an alumina content of less than 22%; and a specific hydroxy nest concentration of less than 0.35 mmol/g and more than 0.05 mmol/g, said specific hydroxy nest concentration =

$$\frac{[(M_{500°\,C.} - M_{200°\,C.}) - (17/9) \times (M_{800°\,C.} - M_{500°\,C.})] \times 1000}{36 \times (1 - M_{200°\,C.}) \times C} \quad \text{(Unit: mmol/g)}$$

wherein $M_{200°\,C.}$, $M_{500°\,C.}$ and $M_{800°\,C.}$ respectively represent the weight loss percents of a sample measured at 200° C., 500° C. and 800° C., and C is the crystallinity of the sample;

wherein said other zeolite is selected from one or more of the following:

Y-type zeolite selected from REY, REHY, DASY, USY, and REUSY;

Mg-containing ultra stable Y-type zeolite;

rare-earth modified, gas-phase ultra stable Y-type zeolite and rare earth-containing, acid-treated, hydrothermally dealuminated Y-type zeolite;

MFI-structured zeolite selected from ZSM-5, ZRP, and ZSP; Beta zeolite; and non-zeolite molecular sieve selected from SAPO and a titanium silicate molecular sieve.

15. The process for preparing the catalytic cracking catalyst according to claim 14, wherein said unit cell size is 2.428-2.438 nm; as percent by weight of the modified Y-type zeolite, the phosphorus content is 0.1-4.5%, the $RE_2O_3$ content is 0.1-4.5%, the alumina content is less than 21%; and the specific hydroxy nest concentration is less than 0.3 mmol/g and more than 0.10 mmol/g.

16. The process for preparing the catalytic cracking catalyst according to claim 14, wherein said clay is selected from the group consisting of kaolin, metahalloysite, montmorillonite, diatomite, halloysite, saponite, rectorite, sepiolite, attapulgite, hydrotalcite, bentonite and any mixture thereof; wherein said inorganic oxide binder is an alumina binder.

17. The process for preparing the catalytic cracking catalyst according to claim 14, wherein said other zeolite is selected from one or more of the following:
   Y-type zeolite selected from REY, REHY, DASY, USY, and REUSY;
   MFI-structured zeolite selected from ZSM-5, ZRP, and ZSP;
   Beta zeolite; and
   non-zeolite molecular sieve selected from SAPO and a titanium silicate molecular sieve.

18. The process for preparing the catalytic cracking catalyst according to claim 14, wherein per 100 weight parts of the catalytic cracking catalyst, using
   10-70 weight parts of the clay on the dry basis;
   10-40 weight parts of the inorganic oxide binder (as oxide); and
   the cracking active component
   wherein said cracking active component comprises:
   (A) 10-50 weight parts of the modified Y-type zeolite on the dry basis;
   (B) optionally, one or more of the following:
      (1) not more than 30 weight parts of MFI-structured zeolite on the dry basis;
      (2) not more than 30 weight parts of Mg-containing ultra stable Y-type zeolite on the dry basis;
      (3) on the dry basis, not more than 30 weight parts of rare earth modified, gas-phase ultra stable Y-type zeolite and/or rare earth-containing, acid-treated, hydrothermally dealuminated Y-type zeolite; and
   (C) optionally,
      (4) on the dry basis, not more than 30 weight parts of Y-type zeolite selected from the group consisting of REY, REHY, DASY, USY, REUSY and any mixture thereof,
   wherein, the total weight of the above (1), (2), (3) and (4) is not more than 40 weight parts.

19. The process for preparing the catalytic cracking catalyst according to claim 14, wherein said modified Y-type zeolite is prepared by the following process, wherein the modified Y-type zeolite is obtained by using a NaY zeolite as starting material and through three exchange steps in which a rare earth-containing substance and a phosphorus-containing substance are used and three hydrothermally treating steps,
   wherein, the introduction of phosphorus and rare earth is done by the exchange step; wherein independently in each exchange step, the zeolite is added to a phosphorus-containing exchanging solution or a rare earth-containing exchanging solution; wherein phosphorus is introduced at any exchange step; and
   wherein rare earth is introduced at any exchange step except the first exchange step.

20. The catalytic cracking catalyst according to claim 3, wherein the alumina binder is selected from a group consisting of γ-alumina, η-alumina, θ-alumina, χ-alumina, pseudoboehmite, boehmite, gibbsite, bayerite, and any mixture thereof.

21. The catalytic cracking catalyst according to claim 6, which further comprises: each of the exchange steps is conducted at 70-90° C. for 1-2 hours.

22. The catalytic cracking catalyst according to claim 6, wherein each of the hydrothermally treating steps is independently conducted at 550-600° C., in a condition of 70%-100% steam for 1-2 hours.

23. The process for preparing the catalytic cracking catalyst according to claim 16, wherein the alumina binder is selected from a group consisting of γ-alumina, η-alumina, θ-alumina, χ-alumina, pseudoboehmite, boehmite, gibbsite, bayerite, and any mixture thereof.

* * * * *

UNITED STATES PATENT AND TRADEMARK OFFICE
CERTIFICATE OF CORRECTION

PATENT NO. : 9,630,171 B2
APPLICATION NO. : 13/929044
DATED : April 25, 2017
INVENTOR(S) : Jun Long et al.

It is certified that error appears in the above-identified patent and that said Letters Patent is hereby corrected as shown below:

In the Claims

Claim 1, Column 37, Lines 45-49:

" $$\frac{[(M_{500°C.} - M_{200°C.}) - (17/9) \times (M_{800°C.} - M_{500°C.})] \times 1000}{36 \times (1 - M_{200°C.}) \times C} \text{ (Unit: mmol/g)}$$ "

Should read:

-- $$\frac{[(M_{500°C}-M_{200°C})-(17/9)\times(M_{800°C}-M_{500°C})]\times 1000}{36\times(1-M_{200°C})\times C} \text{ (Unit:mmol/g)}$$ --.

Claim 14, Column 40, Lines 44-48:

" $$\frac{[(M_{500°C.} - M_{200°C.}) - (17/9) \times (M_{800°C.} - M_{500°C.})] \times 1000}{36 \times (1 - M_{200°C.}) \times C} \text{ (Unit: mmol/g)}$$ "

Should read:

-- $$\frac{[(M_{500°C}-M_{200°C})-(17/9)\times(M_{800°C}-M_{500°C})]\times 1000}{36\times(1-M_{200°C})\times C} \text{ (Unit:mmol/g)}$$ --.

Signed and Sealed this
Second Day of January, 2018

Joseph Matal
*Performing the Functions and Duties of the
Under Secretary of Commerce for Intellectual Property and
Director of the United States Patent and Trademark Office*